(12) United States Patent
Beaumont et al.

(10) Patent No.: US 7,304,648 B2
(45) Date of Patent: Dec. 4, 2007

(54) GENERATING ONE OR MORE LINEAR BLENDS

(75) Inventors: Ian Richard Beaumont, North Ryde (AU); Giles Puckett, Highvale (AU)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

(21) Appl. No.: 10/458,329

(22) Filed: Jun. 11, 2003

(65) Prior Publication Data
US 2004/0012617 A1  Jan. 22, 2004

(30) Foreign Application Priority Data
Jun. 17, 2002  (AU) .................................. PS3005

(51) Int. Cl.
*G09G 5/02*  (2006.01)
(52) U.S. Cl. ............... 345/589; 345/592; 345/606; 345/610; 345/615; 382/270; 382/274
(58) Field of Classification Search ............... 345/589, 345/610, 615
See application file for complete search history.

(56) References Cited

U.S. PATENT DOCUMENTS

| | | | |
|---|---|---|---|
| 4,805,116 A | * | 2/1989 | Liang et al. ............... 345/606 |
| 4,930,092 A | * | 5/1990 | Reilly ...................... 345/423 |
| 5,159,201 A | * | 10/1992 | Frei ......................... 250/492.2 |
| 5,206,628 A | * | 4/1993 | Kelleher ................... 345/606 |
| 5,402,533 A | * | 3/1995 | Kelley et al. ............. 345/426 |
| 5,457,779 A | * | 10/1995 | Harrell .................... 345/502 |
| 5,581,675 A | * | 12/1996 | Shibazaki ................. 345/589 |
| 5,586,196 A | * | 12/1996 | Sussman .................. 382/114 |
| 5,625,768 A | * | 4/1997 | Dye .......................... 345/441 |
| 5,642,774 A | * | 7/1997 | Christenson ............. 165/82 |
| 5,673,379 A | * | 9/1997 | Diehl ....................... 345/441 |
| 5,708,763 A | * | 1/1998 | Peltzer .................... 358/1.16 |
| 5,896,136 A |   | 4/1999 | Augustine et al. ...... 345/431 |
| 6,002,408 A | * | 12/1999 | Long ........................ 345/592 |
| 6,016,151 A | * | 1/2000 | Lin .......................... 345/582 |

(Continued)

FOREIGN PATENT DOCUMENTS

JP          2001101431     *  4/2001

*Primary Examiner*—Kee M. Tung
*Assistant Examiner*—Antonio A Caschera
(74) *Attorney, Agent, or Firm*—Fitzpatrick, Cella, Harper & Scinto

(57) ABSTRACT

A method (1005) generates one or more linear blends. Initially, the method has a list of already received one or more fill-paths defining a current linear blend, and a newly received fill-path, where the fill-paths each comprise a single colored parallelogram (eg. 700). The method adds (1090) the new fill-path to the list to become the last fill-path in the list, if the difference (1230) in color between the new fill-path and the last fill-path in the list is no greater, in each color channel, than a predetermined threshold value multiplied by the difference in color between the last and second-last fill-paths in the list. The predetermined threshold value is preset to such a value so that the new fill-path will not be added to the list if the new fill-path does not visually form part of the current linear blend. The method repeats this step for each new fill-path received until the aforementioned condition is not satisfied. Then, the method generates (1040) one or more linear blends from the first fill-path in the list to the last fill-path in the list.

32 Claims, 29 Drawing Sheets c) Analysis of the 2 sets 5..7 and 7..10.

U.S. PATENT DOCUMENTS

| | | | |
|---|---|---|---|
| 6,057,850 A * | 5/2000 | Kichury | 345/584 |
| 6,121,976 A * | 9/2000 | Lu | 345/606 |
| 6,246,805 B1 * | 6/2001 | Sanjeev et al. | 382/285 |
| 6,268,859 B1 * | 7/2001 | Andresen et al. | 345/421 |
| 6,313,840 B1 * | 11/2001 | Bilodeau et al. | 345/423 |
| 6,329,977 B1 * | 12/2001 | McNamara et al. | 345/589 |
| 6,337,692 B1 * | 1/2002 | Rai et al. | 345/594 |
| 6,337,925 B1 * | 1/2002 | Cohen et al. | 382/199 |
| 6,421,084 B1 | 7/2002 | Chang et al. | 348/273 |
| 6,532,081 B1 | 3/2003 | Cecchi et al. | 358/1.9 |
| 6,552,726 B2 * | 4/2003 | Hurley et al. | 345/426 |
| 6,552,731 B1 * | 4/2003 | Gonsalves | 345/589 |
| 6,660,489 B2 * | 12/2003 | Schrecengost et al. | 435/8 |
| 6,771,264 B1 * | 8/2004 | Duluk et al. | 345/426 |
| 6,774,896 B2 * | 8/2004 | Oka | 345/426 |
| 6,774,907 B1 * | 8/2004 | Gupta | 345/589 |
| 6,809,740 B1 * | 10/2004 | Weed | 345/589 |
| 6,870,954 B1 * | 3/2005 | Gupta | 382/162 |
| 6,879,327 B1 * | 4/2005 | Mathur et al. | 345/589 |
| 6,894,695 B2 * | 5/2005 | vanWelzen | 345/582 |
| 6,914,602 B2 * | 7/2005 | Kaskel | 345/426 |
| 6,914,614 B2 * | 7/2005 | Kobayashi | 345/600 |
| 6,933,948 B2 * | 8/2005 | Gonsalves | 345/589 |
| 2002/0080147 A1 | 6/2002 | Edge et al. | 345/600 |
| 2004/0150734 A1 | 8/2004 | Sobel et al. | 348/272 |
| 2004/0179752 A1 | 9/2004 | Cheng et al. | 382/300 |

* cited by examiner

Fig. 5A  Vertical Down Right Gradient Fill.
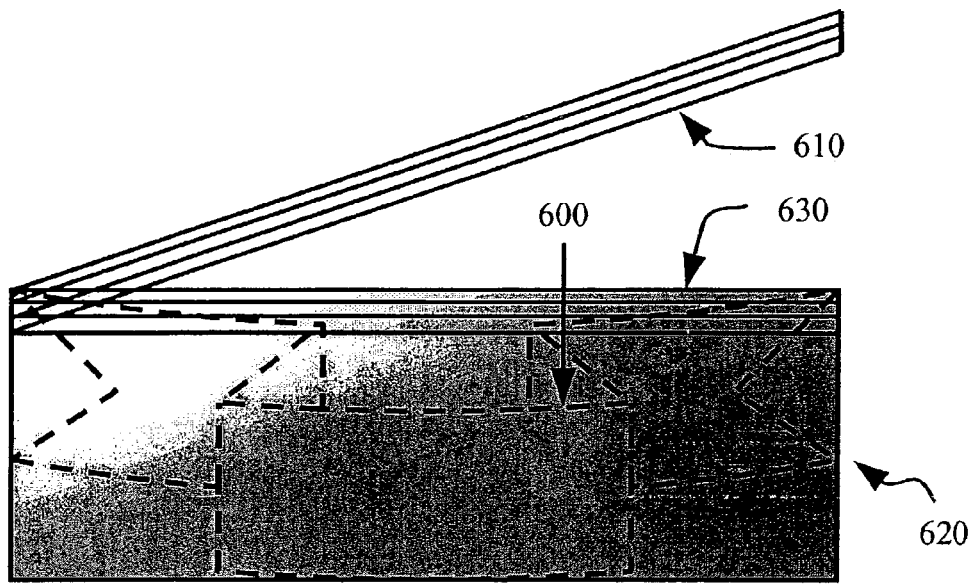
Fig. 5B  Vertical Down Left Gradient Fill.
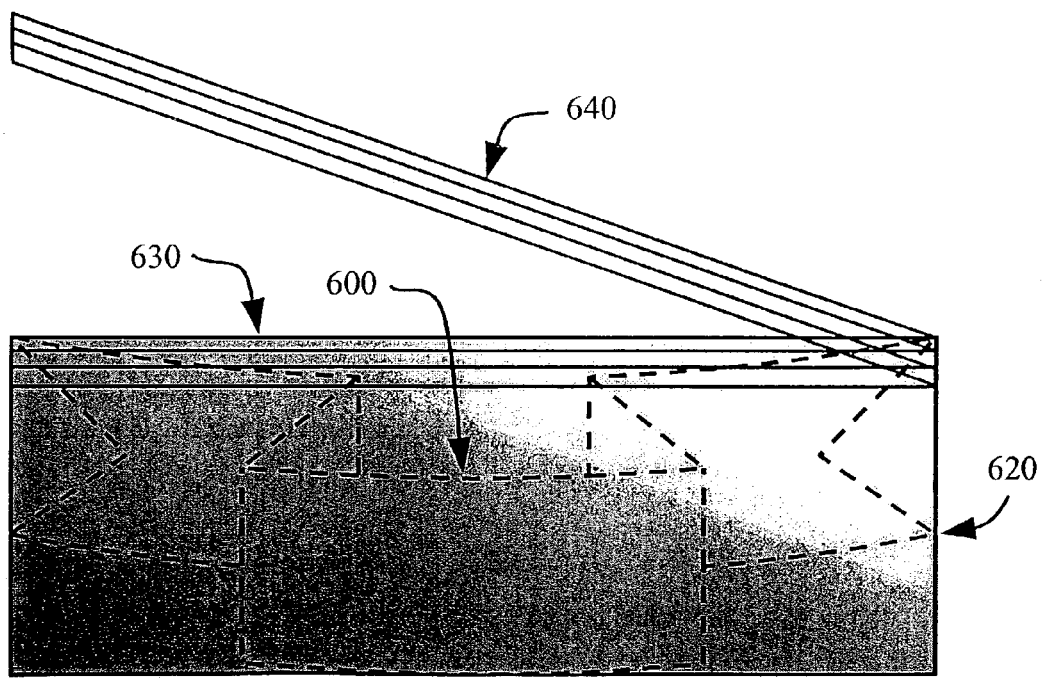

Fig. 5C    Vertical Up Left Gradient Fill.
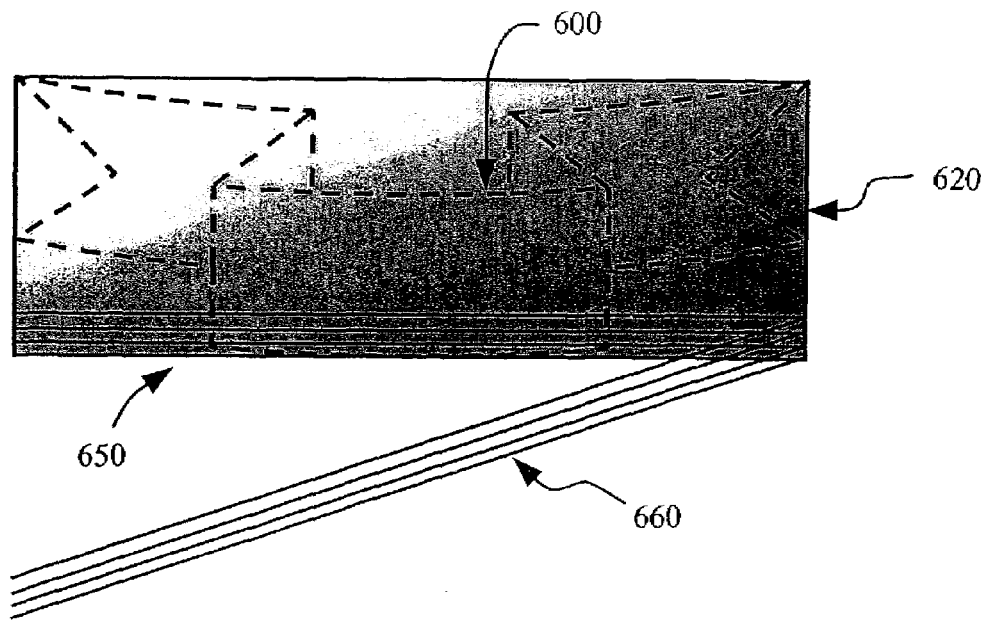
Fig. 5D    Vertical Up Right Gradient Fill.
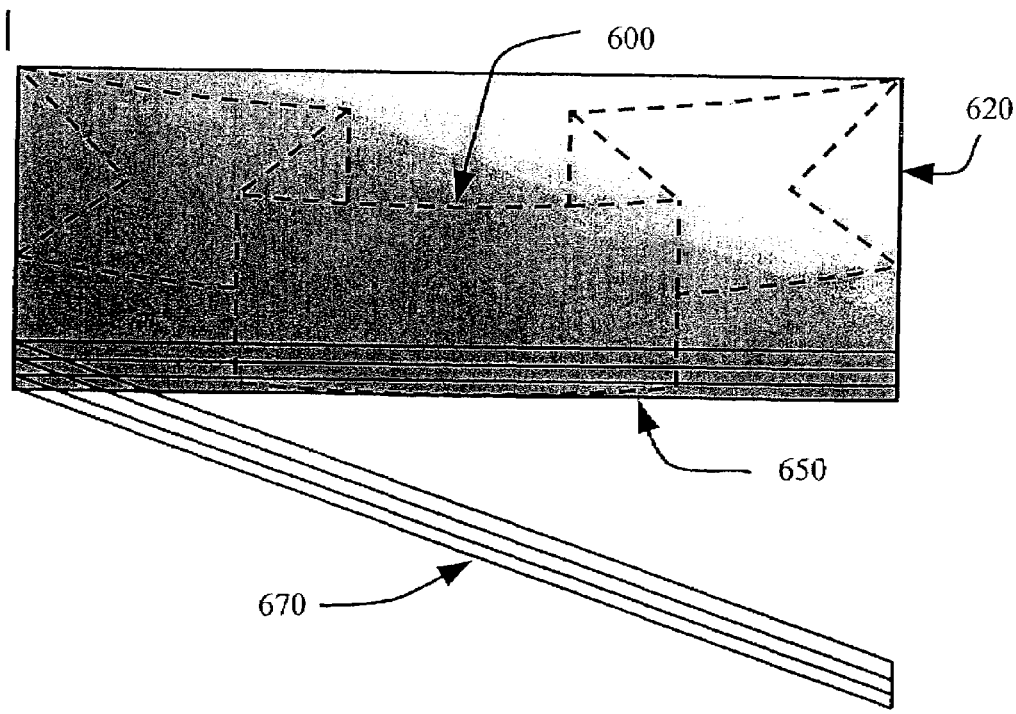

Fig. 6A  Horizontal Down Right Gradient Fill.
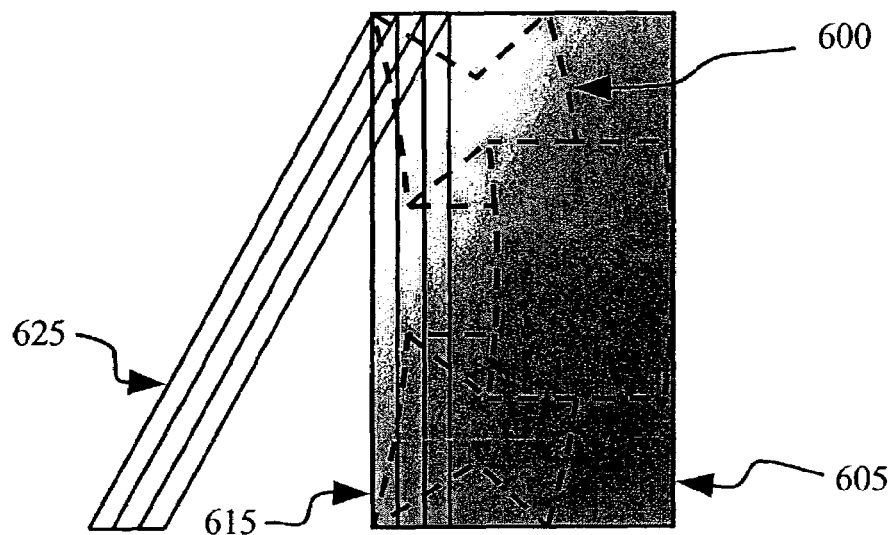
Fig. 6B  Horizontal Up Right Gradient Fill.
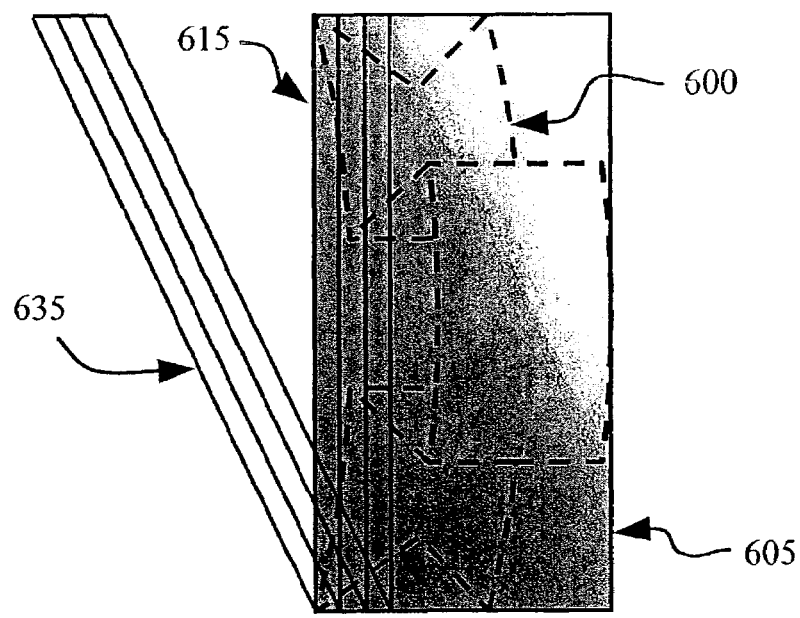

Fig. 6C  Horizontal Up Left Gradient Fill
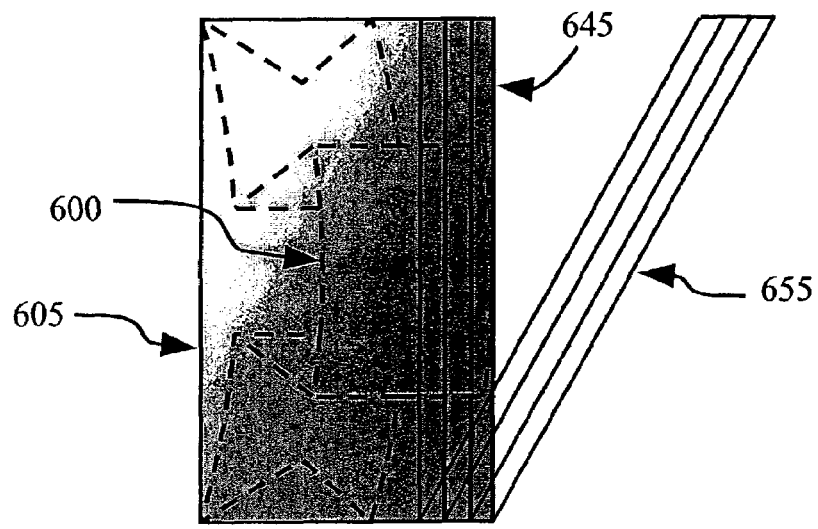
Fig. 6D  Horizontal Down Left Gradient Fill
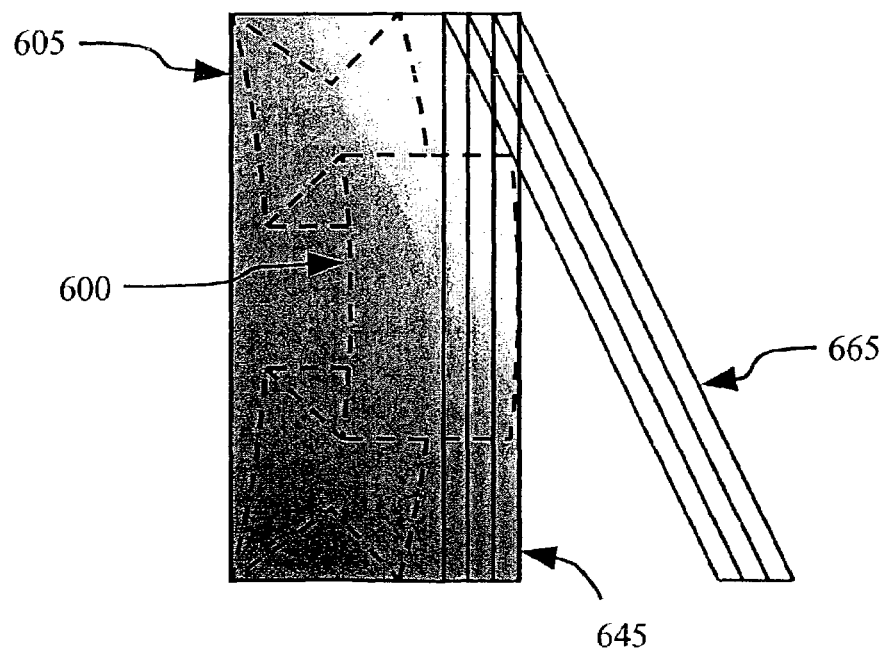

Vertical Angles

$$\theta = \arctan\left(\frac{Y}{X}\right)$$

$$Z = Height \cdot \cos(\theta)$$

$$P = Z \cdot \cos(\theta)$$

$$Q = Z \cdot \sin(\theta)$$

$$P = Height \cdot \cos^2\left(\arctan\left(\frac{Y}{X}\right)\right)$$

$$Q = Height \cdot \sin\left(\arctan\left(\frac{Y}{X}\right)\right) \cdot \cos\left(\arctan\left(\frac{Y}{X}\right)\right)$$

Horizontal Angles

$$\theta = \arctan\left(\frac{Y}{X}\right)$$

$$Z = Height \cdot \sin(\theta)$$

$$P = Z \cdot \cos(\theta)$$

$$Q = Z \cdot \sin(\theta)$$

$$P = Height \cdot \cos\left(\arctan\left(\frac{Y}{X}\right)\right) \cdot \sin\left(\arctan\left(\frac{Y}{X}\right)\right)$$

$$Q = Height \cdot \sin^2\left(\arctan\left(\frac{Y}{X}\right)\right)$$

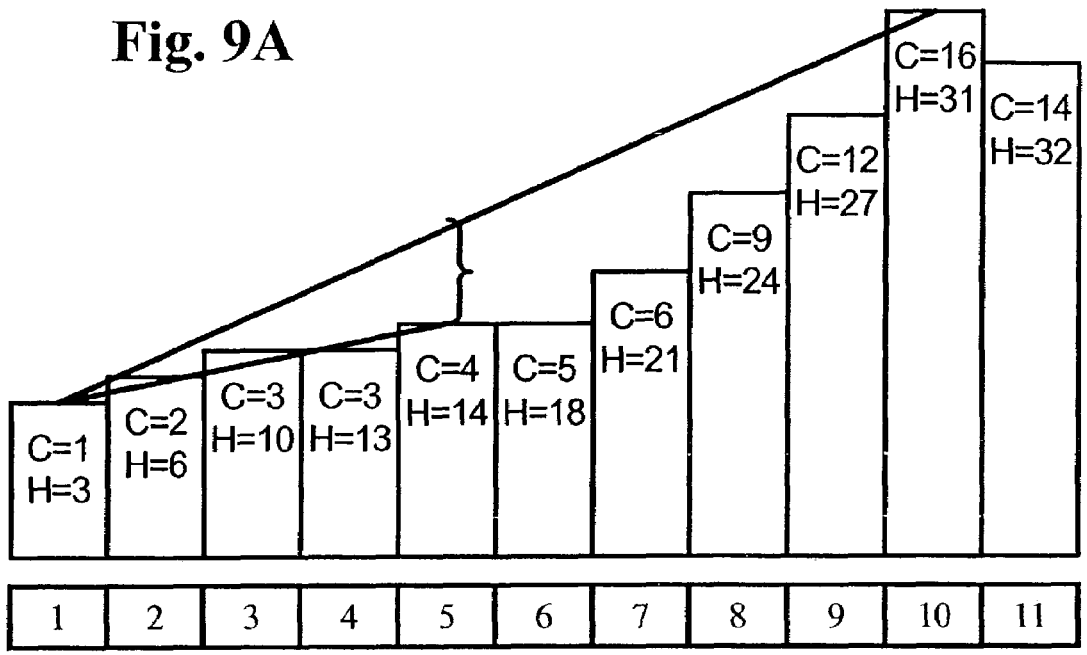
a) The color gradients for a set of fill-paths 1..10.
   (C = color value, H = accumulated height.)
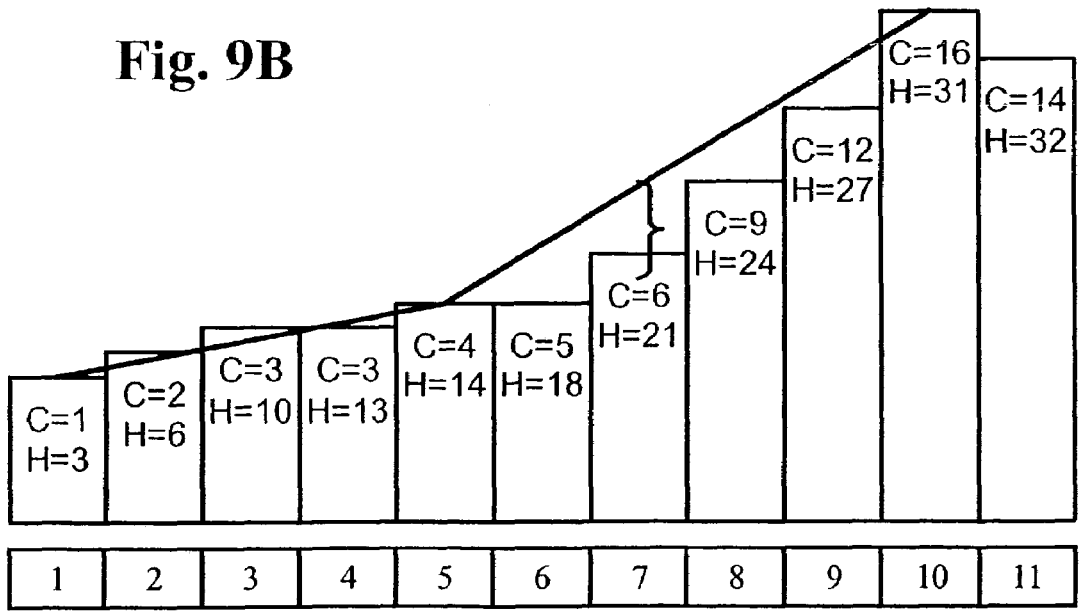
b) Analysis of the 2 sets 1..5 and 5..10.

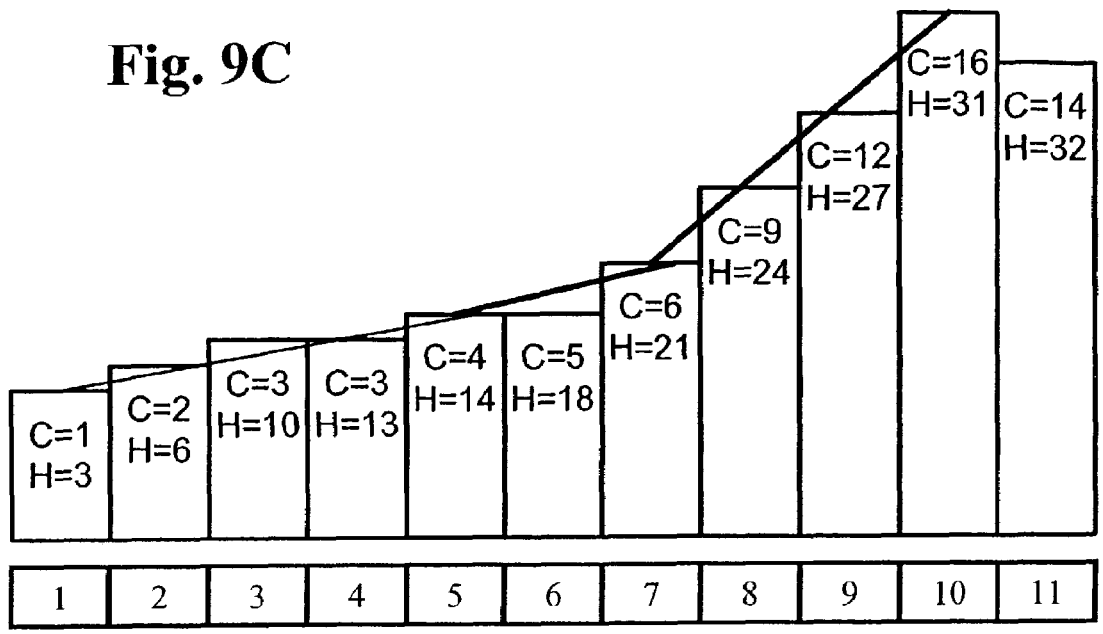
c) Analysis of the 2 sets 5..7 and 7..10.

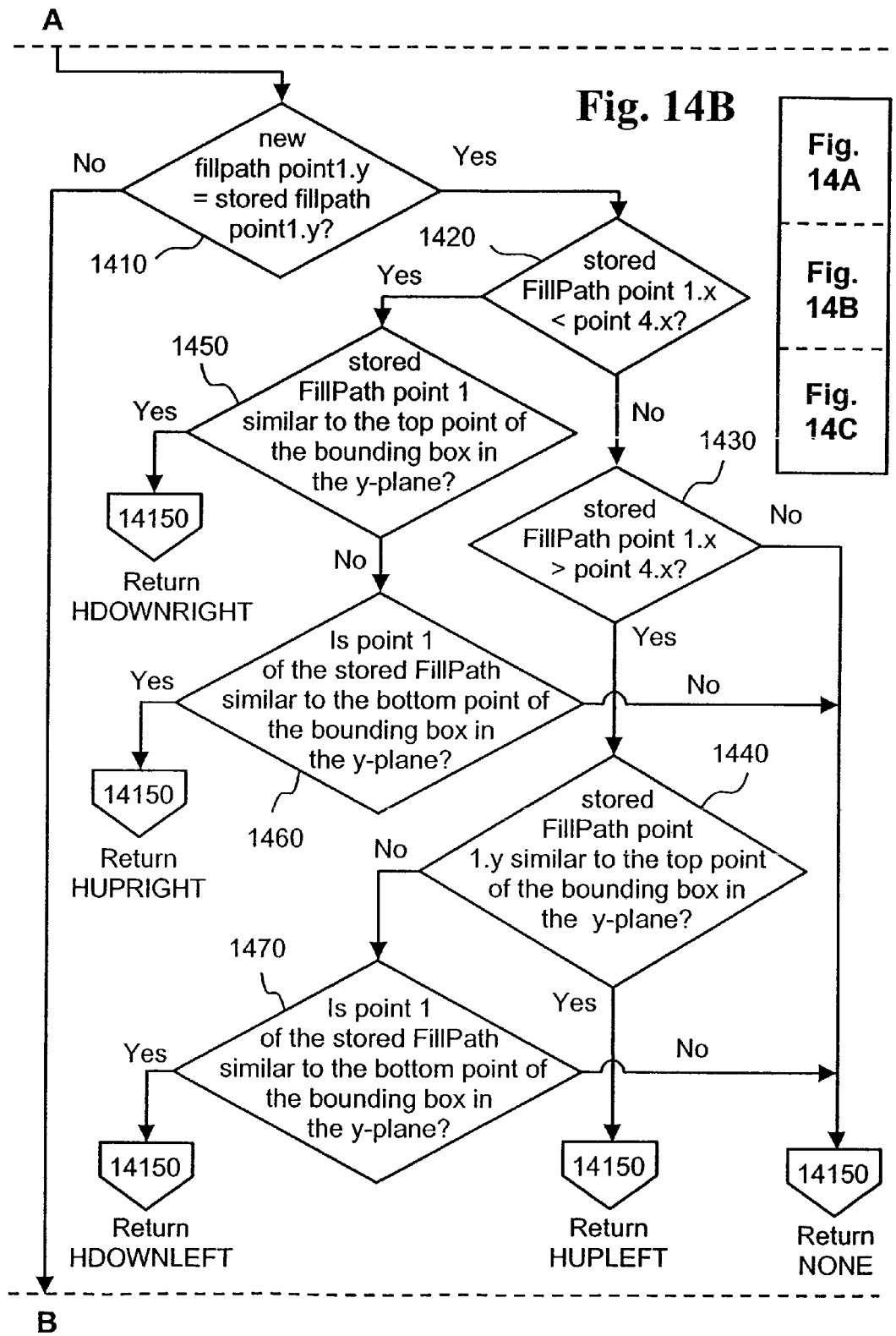

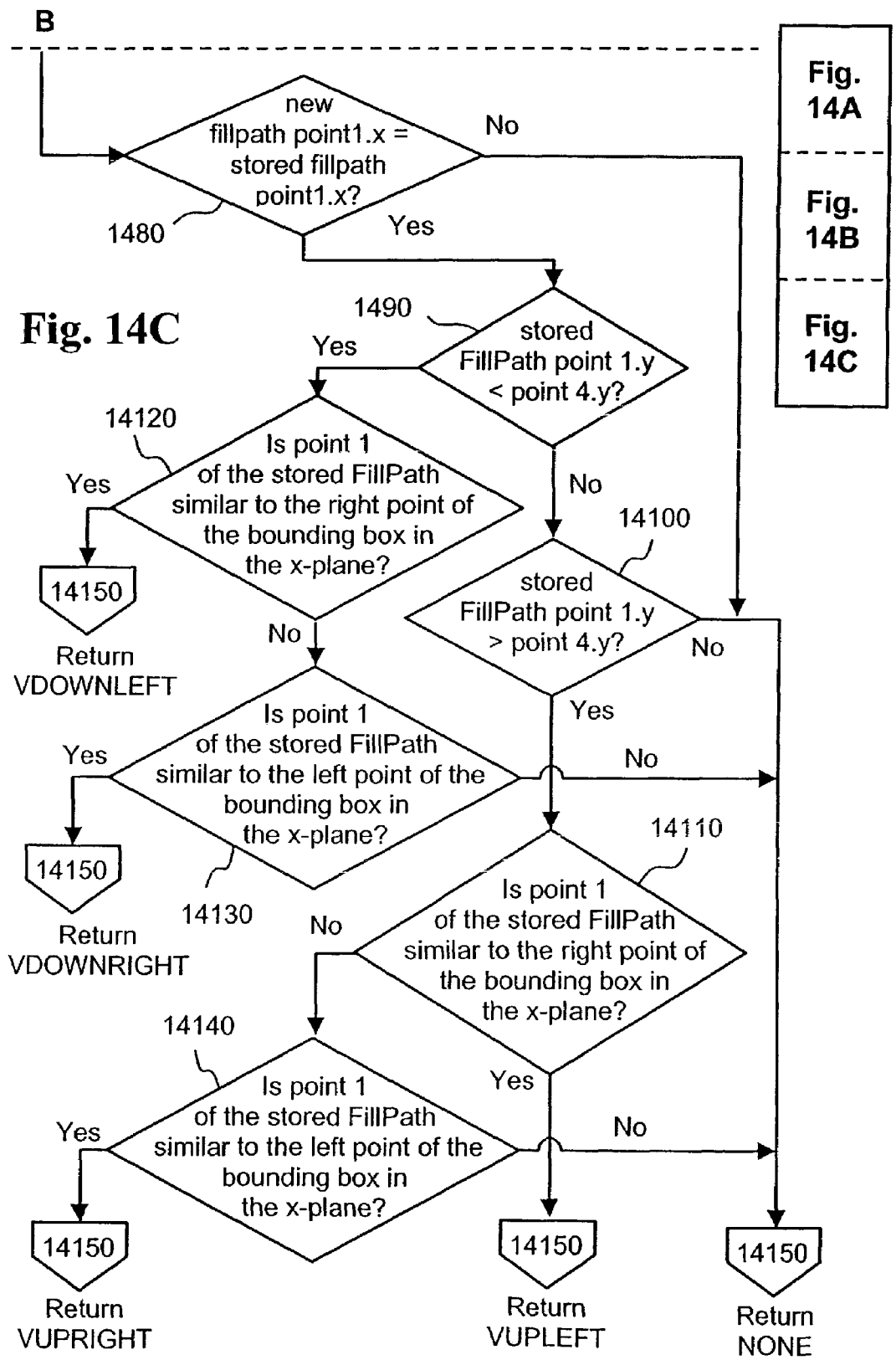

GENERATING ONE OR MORE LINEAR BLENDS

FIELD OF THE INVENTION

The present invention relates to electronic image generation and control and, in particular, relates to generating one or more linear blends.

BACKGROUND

Traditionally, software applications such as word processors, create page-based documents where each page contains graphic objects such as text, lines, fill regions and image data. When representing the document data on a display device or a printing device, such software applications typically send commands defined in terms of the graphics interface services of a native operating system within which the software application operates. The graphics interface services of the native operating system are typically known as the graphics device interface (GDI) layer. The GDI layer is generally an application programming interface (API) providing a rich set of graphics features to all applications. Typically, a graphics rendering system renders the graphics objects received from the GDI layer, generating pixels, which are then sent to the output device. Rendering is the process by which the graphics objects received from the GDI layer are converted to pixels by the graphics rendering system, which are then sent to the output device for storage, display, or printing.

Turning to FIG. 1 there is shown a traditional relationship between a prior art software application 110, a graphics device interface layer 120, a graphics rendering system 130, and an output device 140. The application 110 passes each page of a document as a series of commands defined in terms of the graphic interfaces services which describe the graphic objects of the page. The GDI layer 120 mediates between the application program 110 and the output device 140, such that the GDI layer 120 enables the graphics rendering system 130 to support a much smaller set of functionality, such as drawing rectangular blocks of image data, and filling simple regions with flat color. The GDI layer 120 also provides graphics objects to the graphics rendering system 130 in a format that the GDI layer 120 determines that the rendering system 130 would process most efficiently, and at a resolution of the output device 140. The graphics rendering system 130 then renders the graphics objects received from the GDI layer 120, generating pixels, which are then sent to the output device 140.

In some known graphic rendering systems, rendering is a two-stage process. In these rendering systems, graphics objects are first converted into an intermediate language before the rendering process begins. In one such system, the first stage of the process converts each graphic object received from the GDI layer into some intermediate edge-based object graphics format, such that all edges are sorted in ascending y, then ascending x, these corresponding respectively to the scan lines and pixel locations on such scan lines in a rasterized display. The output from this stage is typically a display list of edges and their associated fill priority (z-order), along with other information such as if this edge is a clipping edge or a filling edge. This is sometimes called a job. The job contains all the information needed by the second stage to render the page. The second stage of the process involves a rendering module parsing the job and generating the pixels for the output device for each scanline down the page.

In some GDI layers, a graphics object filled with a smooth blend of color is represented by the GDI layer as a series of adjacent single-colored parallelograms, each differing in color by some small offset from the previous, and which is clipped over the area of the graphics object. The parallelograms may proceed left to right, top to bottom or diagonally across the page.

Some applications refer to this type of fill as a gradient fill (Microsoft Word) or a fountain fill (Corel Draw). For sake of clarity, this type of fill is referred for the purposes of this description as a gradient fill. An example of a graphic object 210 filled with a diagonal gradient fill as produced by a typical prior art application is shown in FIG. 2A. The method of filling an object with a gradient fill is dependent on the application. However, in its simplest form, such a method typically consists of specifying a start color and an end color at each end of a bounding box of the graphic object being filled. FIGS. 2A, 2B, 2C illustrate how a diagonal gradient fill is typically passed by the application to the GDI layer to the graphics rendering system.

Some graphics rendering systems typically support a simple form of the gradient fill effect called a linear ramp or a linear blend. This can be represented by a starting reference point on the page, with an associated starting color, accompanied by a constant gradient change per color channel per pixel, on a line parallel to the gradient of the blend.

However, applications are generally not restricted to outputting a blend comprising a purely linear gradient fill effect. In fact, color changes in gradient fill effects produced by some applications can be parabolic or even sinusoidal. An example of an object 300 having a sinusoidal gradient fill produced by a prior art application is shown in FIG. 3.

Typically, the GDI layer reduces the gradient fill to a set of single-colored parallelograms, referred to here as fill-paths, with an accompanying clipping object. For example, FIG. 2B, shows the fill-paths and clipping object passed to the graphics rendering system by a typical prior art GDI layer, which were produced from the example gradient fill as shown in FIG. 2A. The GDI layer reduces the gradient fill to a set of single colored fill-paths 250 and a clip object 220. For sake of clarity, FIG. 2B shows only two exaggerated fill-paths 250. The entire set of the fill-paths 230 covers a rectangular area 260, with each fill-path 250 parallel to and adjoining its adjacent fill-path(s). The length of the sides of these fill-paths 250 depends on the resolution at which rendering occurs. For example, at 600 dpi, each fill-path 250 is typically no greater than 100 pixels high, but each can vary in width by several pixels. Also, each fill-path 250 has a slightly different interior color from the previous fill-path 250. This produces a smooth blend of colors associated with the gradient fill when the object is rendered. Turning now to FIG. 2C, there is shown the result of the rendering of the example shown in FIG. 2B by a typical prior art graphics rendering system. In the latter case, the rendering system has clipped the bounding box 260 comprising the fill-paths 250 with the clipping object 220 resulting in the object 210. In FIG. 2C, the result after rendering is the same as FIG. 2A.

There are a number of conventional methods for rendering such a representation of a gradient fill effect.

One conventional method is to simply render each fill-path. Many graphics rendering systems use a Painters algorithm style of rendering where each object is drawn onto a frame buffer as it arrives. A 2-stage object-graphics rendering system that firstly converts all incoming objects into some intermediate format for the page, and then renders each scanline, is at a disadvantage in rendering each fill-path. For the gradient fill shown in FIG. 2A, the GDI layer generates 128 fill-paths at 600 dpi. It can be seen that in the case of the blend proceeding top to bottom or bottom to top, then on any scanline, only one fill-path is active. But in the worst case of the blend proceeding left to right or right to left, all 128 fill-paths are active on a scanline, equating to 256 edges per scanline. Hence for an object-based rendering system, such a method of rendering is considerably inefficient. Also, each flat fill must be stored in the intermediate object-graphics format, and accessed for each fill-path for each scanline. This method consists of large amounts of memory accesses and can also consume large amounts of fill resources when the number of fill-paths is in the order of thousands. This occurs frequently when printing to pages larger than A3 at high-resolutions.

On an aesthetic level, another disadvantage of simply rendering each fill-path is that although the intended effect is clearly a smooth blend, an artifact called Mach Banding can occur. Since the eye is more sensitive to edges than it is to smooth changes in color, the eye can often see the division of rectangles when a gradient fill effect is rendered this way. The divisions become even clearer at some parts of the color gamut. Also, if the entire image is enlarged, then each fill-path is also enlarged and Mach Banding becomes highly visible.

At the application-level, another conventional method for dealing with gradient fill effects is to simply render the fill effect onto a bitmap and send this to the GDI layer. This method is effective for small fill regions, but has the disadvantage of being slower to draw and cumbersome to render since every pixel of an image has to be dealt with by the graphic rendering system. This method also does not scale well when the object is enlarged (duplication of pixels) or reduced (loss of pixels).

Another conventional method is to test each incoming fill-path for linearity and when the next fill-path is no longer linear within some error, then to create an equivalent linear blend up to this fill-path. Tracking for linearity then starts again from this next fill-path. This method can dramatically reduce the number of graphic objects needing to be rendered. In the best case scenario the entire graphic object can be described by a single linear blend. For the diagonal gradient fill as shown in FIG. 2A, this would represent a $\frac{1}{128}^{th}$ reduction of the number of edges per scanline than if this were drawn with multiple fill-paths.

However, this method has its disadvantages. As described above, an application may provide gradient fill effects more advanced than a simple linear blend. Such effects may consist of several color changes throughout the object being filled (eg. sinusoidal as in FIG. 3), or they may follow some non-linear curve as in FIGS. 4A or 4B. Similarly, the lengths of the sides of consecutive fill-paths are not necessarily constant. In either case, the resulting set of fill-paths describing the object does not necessarily consist of a constant change in color for each fill-path even though the desired overall effect in each case is a smooth blend of color across the graphic object.

In this method an error factor is applied to determine the linearity of the next fill-path in a series of fill-paths. If the next fill-path is different to the previous fill-path by a constant difference plus or minus some error, then it is merged into the linear blend being tracked. If this error factor is too small, then it results in many linear blends, defeating the purpose of this method. If this error factor is too large, then it results in color shifting such that the output would not correctly represent the input. For example, turning to FIG. 4A there is shown a non-linear blend varying from black in the top-left corner to white in the bottom right corner, where the midpoint color between black and white is located at 25% of the distance between the top-left and bottom right corners. Also, FIG. 4B shows a similar non-linear blend, but where the midpoint color is located at 75% of the distance between the top-left and bottom right corners. If the non-linear fill-paths shown in FIGS. 4A or 4B were tracked using a large enough such error factor, then the result would be a pure linear blend from black in the top-left corner to white in the bottom-right corner as shown FIG. 4C. The result is clearly not what the user of the application intended.

Also, when the fill-paths are combined into multiple linear blends, then Mach Banding tends to become noticeable between adjacent linear blends. This banding is highly visible because the linear blends are split at their greatest error, delineating the adjacent linear blends more markedly than if individual fill-paths were rendered.

SUMMARY

It is an object of the present invention to substantially overcome, or at least ameliorate, one or more disadvantages of existing arrangements.

According to a first aspect of the present disclosure, there is provided a method of generating one or more linear blends, wherein the method initially comprises a list of already received one or more fill-paths defining a current linear blend, and a newly received fill-path, where the fill-paths each comprise a single colored parallelogram, the method comprising the steps of: (a) adding the new fill-path to the list to become the last fill-path in the list, if a number of conditions are met, otherwise proceeding to step (c), wherein one of the number of conditions is based on the color of the new fill-path and the last fill-path and a threshold value, and the threshold value is preset to such a value so that the new fill-path will not be added to the list if the new fill-path does not visually form part of the current linear blend; (b) repeating step (a) for each new fill-path received; and (c) generating one or more linear blends from the first fill-path in the list to the last fill-path in the list.

According to a second aspect of the present disclosure, there is provided a method of generating one or more linear blends from a list of one or more fill-paths defining a current linear blend, and at least one new fill-path, where the fill-paths each comprise a single colored parallelogram, the method comprising the steps of:

(a) adding one said new fill-path to said list to become a last fill-path in said list, if each condition of a set thereof is met, otherwise proceeding to step (c), said set comprising at least one condition, said one condition being based on the color of the new fill-path and the last fill-path and a threshold value, and said threshold value is preset to such a value so that the new fill-path will not be added to the list if the new fill-path does not visually form part of the current linear blend;

(b) repeating said step (a) for each remaining said new fill-path; and (c) generating one or more linear blends from the first fill-path in said list to the last fill-path in said list.

Preferably, the set of conditions further comprises conditions selected from the group consisting of:

a (second) condition that the new fill-path is physically contiguous with the last fill-path in the list;

a (third) condition that a height of the new fill-path is no greater than two times a height of the most recently added fill-path in the list, the height being measured in a direction determined by physical positions of the fill-paths of the list;

a (fourth) condition that the number of fill-paths in the current linear blend is greater than 1;

a (fifth) condition that a sum of the accumulated height of the fill-paths in the linear blend and a rectangle-height of the new fill-path is less than a predefined maximum;

a (sixth) condition that a raster operation for the currently received fill-path does not use a destination, and is the same as a raster operation for the current linear blend; and a (seventh) condition that the currently received fill-path has the same clip as the current linear blend.

Other aspects of the invention, including apparatus, computer programs and computer media arranged to perform the methods, are also disclosed.

BRIEF DESCRIPTION OF THE DRAWINGS

One or more embodiments of the present invention will now be described with reference to the drawings, in which:

FIGS. 5A to 5D and 6A to 6D are diagrams of the different definitions of the direction in which a diagonal gradient fill may travel.

FIGS. 9A, 9B, and 9C show values of a color channel of an exemplary set of fill-paths for the purposes of illustrating the method of generating one or more linear blends;

FIGS. 14A, 14B and 14C show a flow chart of the get_alignment sub-process called by the add_rect, check_fill, and check_output_fill sub-processes of FIGS. 11, 12, and 13 respectively;

DETAILED DESCRIPTION INCLUDING BEST MODE

Figure 1:
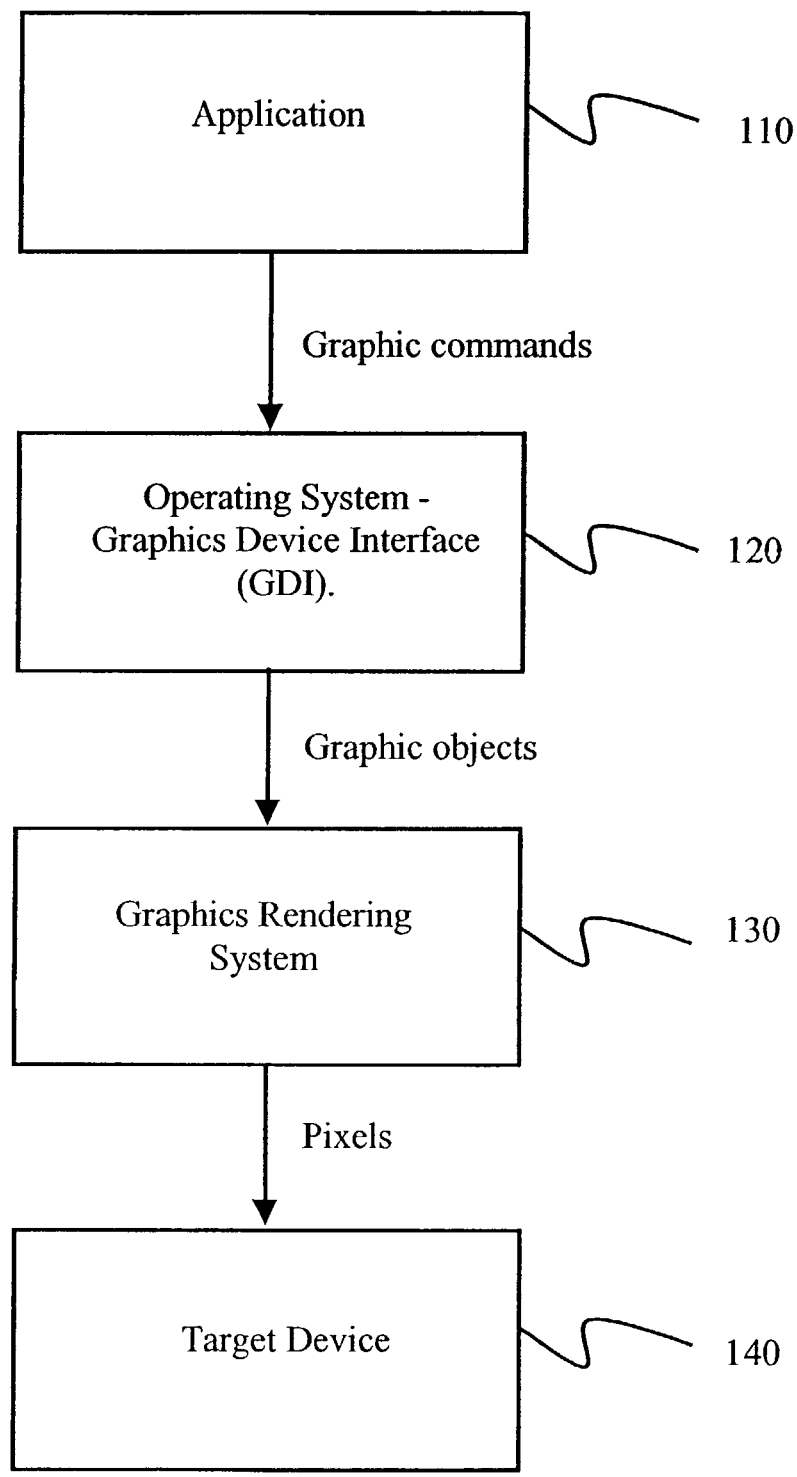
FIG. 1 shows the relationship between a prior art application, graphics device interface layer, graphics rendering system, and output device.
Figure 2A:
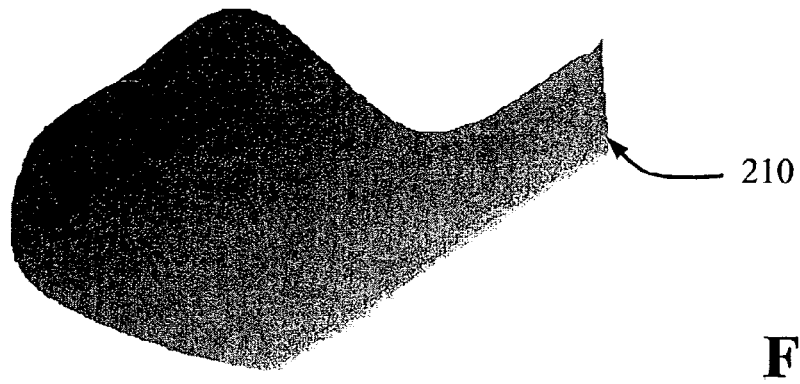
FIG. 2A shows an example of a graphic object 210 filled with a diagonal gradient fill as produced by a typical prior art application.
Figure 2B:
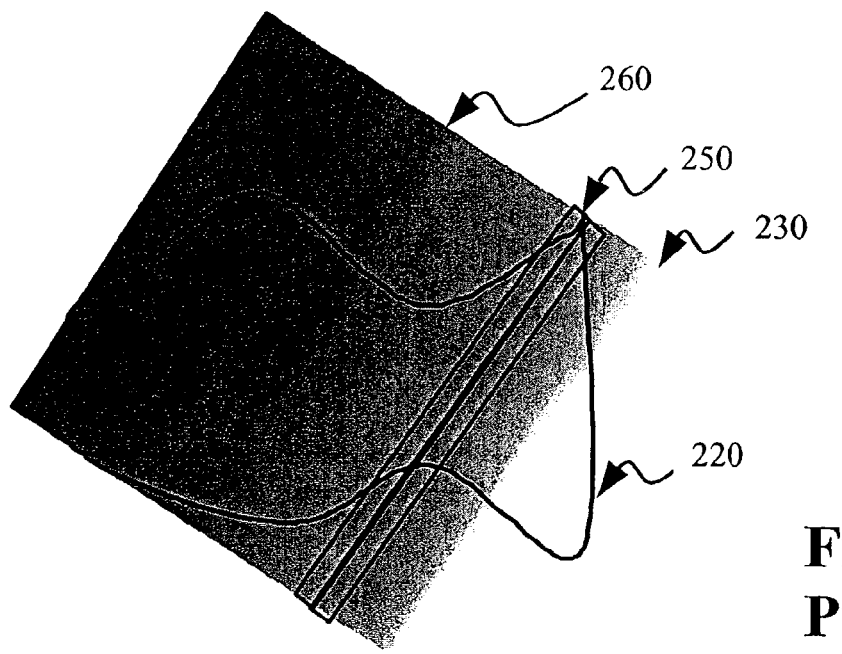
FIG. 2B shows fill-paths and a clipping object passed to a typical prior art graphics rendering system by a typical prior art GDI layer, of the example gradient fill as shown in FIG. 2A.
Figure 2C:
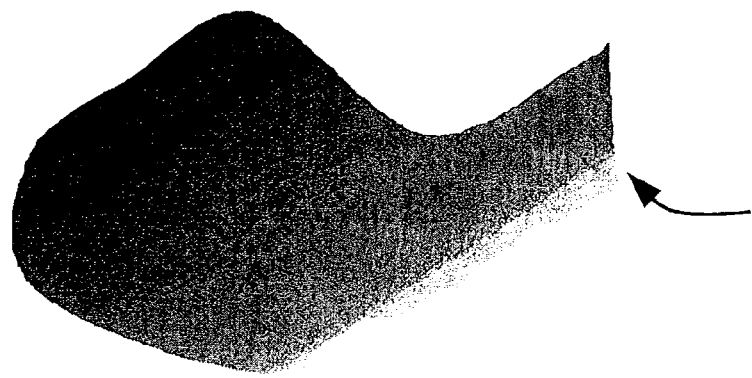
FIG. 2C shows the result of the rendering of the example shown in FIG. 2B by a typical prior art graphics rendering system.
Figure 3:
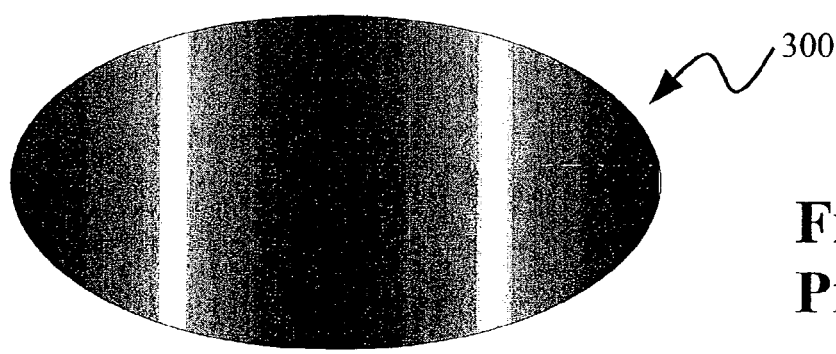
FIG. 3 shows an example of a sinusoidal gradient fill effect produced by a prior art application.
Figure 4A:
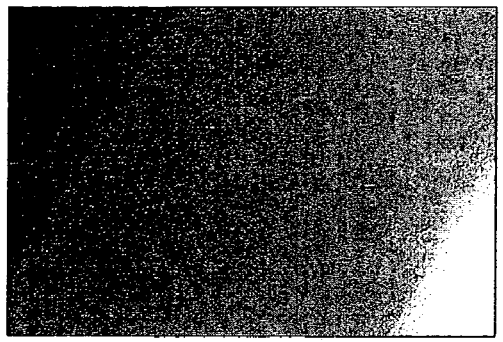
FIG. 4A shows a diagonal non-linear gradient fill effect from black to white where the midpoint between black and white is 25% of the length of the blend produced by a prior art application.
Figure 4B:
FIG. 4B shows a diagonal non-linear gradient fill effect from black to white where the midpoint between black and white is 75% of the length of the blend produced by a prior art application.
Figure 4C:
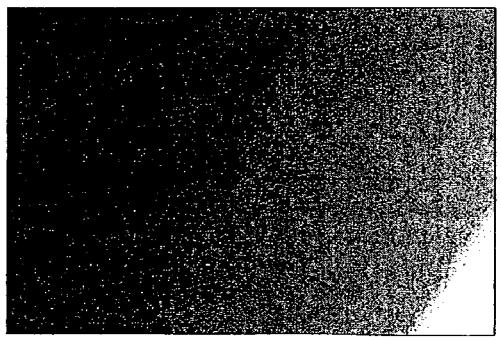
FIG. 4C shows a diagonal gradient fill effect from black to white where the midpoint between black and white is 50% of the length of the blend produced from the gradient fill effects shown in FIG. 4A or FIG. 4B by a prior art graphics rendering system.

Where reference is made in any one or more of the accompanying drawings to steps and/or features, which have the same reference numerals, those steps and/or features have for the purposes of this description the same function(s) or operation(s), unless the contrary intention appears.

Figure 17:
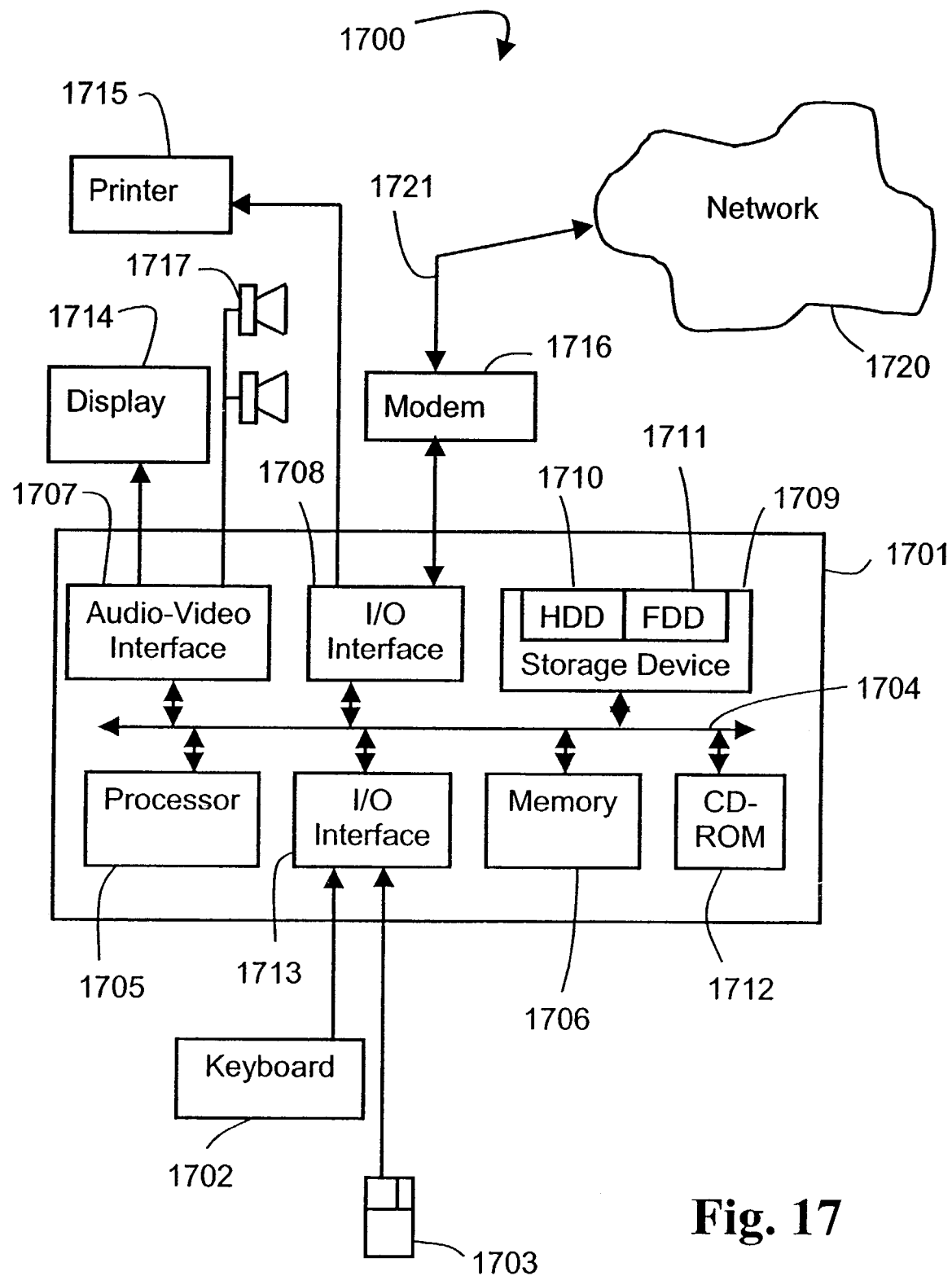
FIG. 17 is a schematic block diagram of a general-purpose computer upon which arrangements described can be practiced.

A method for generating linear blends is preferably implemented as a software module for running on a processor of a general-purpose computer. A typical general-purpose computer for executing such a software module is described below with reference to FIG. 17. The software module is preferably a part of a first stage of a graphics rendering system that interfaces to a graphics device interface (GDI) layer and receives graphics objects for a page, converting each graphics object to an intermediate edge-based format. In the second stage of the graphics rendering system, the job is rendered and the resulting pixels are output to a downstream device, such as a printer or graphics card. Preferably, both stages of the graphics rendering system are implemented as modules in a graphics software application. Alternatively, the first stage is implemented as a software application, which interfaces with the second stage, which is implemented as a hardware device coupled to a bus for communicating with the first stage operating on the processor.

The GDI layer is preferably an application-programming interface (API) and provides the graphics rendering system with a gradient fill as a series of fill-paths.

Although the following method describes the case of a non-orthogonal gradient fill effect, and specifically where the fill-paths arrive in the order top-left to bottom-right with vertical sides, it can be easily modified to handle the cases where the fill-paths proceed in any orthogonal or non-orthogonal direction.

Before proceeding with the detailed description, a brief review of terminology is discussed.

1.0 Definitions

A fill-path is defined as a single-colored (or flat-colored) parallelogram. The term parallelogram is also taken to include a rectangle or a square. Where a gradient fill proceeds exactly horizontally or vertically, the fill-path is generally rectangular in shape. For gradient fills proceeding diagonally across the page, the fill-path is a parallelogram.

The direction in which a non-orthogonal gradient fill travels can be any one of 8 directions. These directions are partitioned into gradient fills that use horizontal fill-paths and gradient fills that use vertical fill-paths and are defined as follows:

Horizontal Gradient Fills:
  Horizontal Down Left, HDOWNLEFT.
  Horizontal Up Left, HUPLEFT.
  Horizontal Down Right, HDOWNRIGHT.
  Horizontal Up Right, HUPRIGHT.
  Horizontal Left, LEFT
  Horizontal Right, RIGHT
Vertical Gradient Fills
  Vertical Down Left, VDOWNLEFT.
  Vertical Up Left, VUPLEFT.
  Vertical Down Right, VDOWNRIGHT.
  Vertical Up Right, VUPRIGHT.
  Vertical Down, DOWN
  Vertical Up, UP FIGS. 5A to 5D and 6A to 6D illustrate the aforementioned definitions of the direction in which a diagonal gradient fill may travel. FIGS. 5A to 5D illustrate vertical gradient fills whereas FIGS. 6A to 6D illustrate horizontal gradient fills FIG. 5A shows a clipping object 600, which is in the form of a banner, and its bounding box 620, and fill-paths 610. A number of fill-paths 610 proceed in a vertical direction from the top left corner towards the bottom right corner of the bounding box 620, and are defined as Vertical Down Right. Also shown are vertical fill-paths 630, and are defined as Down.

FIG. 5B shows the same clipping object 600 and bounding box 620, and fill-paths 640. The fill-paths 640 proceed in a vertical direction from the top right corner towards the bottom left corner of the bounding box 620, and are defined as Vertical Down Left. Also shown are vertical fill-paths 630, and are defined as Down.

FIG. 5C shows the same clipping object 600 and bounding box 620. The fill-paths 660 proceed in a vertical direction from the bottom right corner towards to the top left corner of the bounding box 620, and are defined as Vertical Up Left. Also shown are vertical fill-paths 650, and are defined as Up.

FIG. 5D shows the same clipping object 600 and bounding box 620. The fill-paths 670 proceed in a vertical direction from the bottom left corner towards to the top right corner of the bounding box 620, and are defined as Vertical Up Right. Also shown are vertical fill-paths 650, and are defined as Up.

FIG. 6A shows the clipping object 600, and its bounding box 605, and fill-paths 625. The fill-paths 625 proceed in a horizontal direction from the top left corner towards the bottom right corner of the bounding box 620, and are defined as Horizontal Down Right. Also shown are horizontal fill-paths 615, and are defined as Right.

On the other hand, the fill-paths 635 of FIG. 6B proceed in a horizontal direction from the bottom left to the top right of the bounding box and are defined as Horizontal Up Right. Again the horizontal fill-paths 615, and are defined as Right.

FIG. 6C shows the clipping object 600, and its bounding box 605, and fill-paths 655. The fill-paths 655 proceed in a horizontal direction from the bottom right corner towards the top left corner of the bounding box 605, and are defined as Horizontal Up Left. Also shown are horizontal fill-paths 645, and are defined as Left.

On the other hand, the fill-paths 665 of FIG. 6D proceed in a horizontal direction from the top right to the bottom left of the bounding box and are defined as Horizontal Down Left. Again, the horizontal fill-paths 645, and are defined as Left.

However, if a fill-path is deemed not aligned with an adjacent fill-path then no (ie. a NULL) direction is assigned. Having no direction means that a gradient fill will not be created, or the new fill-path will not be accepted as part of the current fill.

Figure 7A:
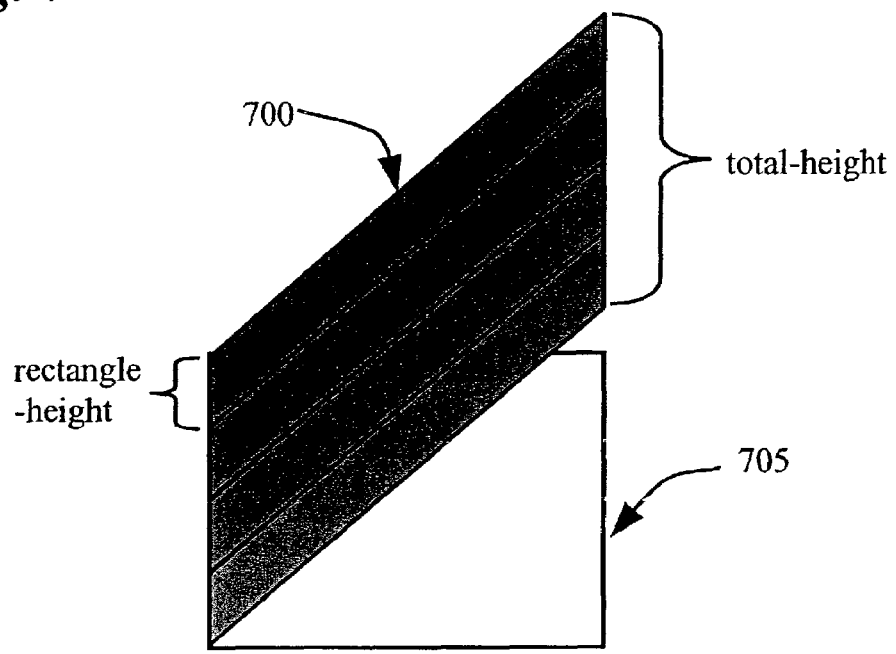
FIGS. 7A and 7B shows the definitions of total-height and rectangle-height depending on the direction of the gradient fill.
Figure 7B:
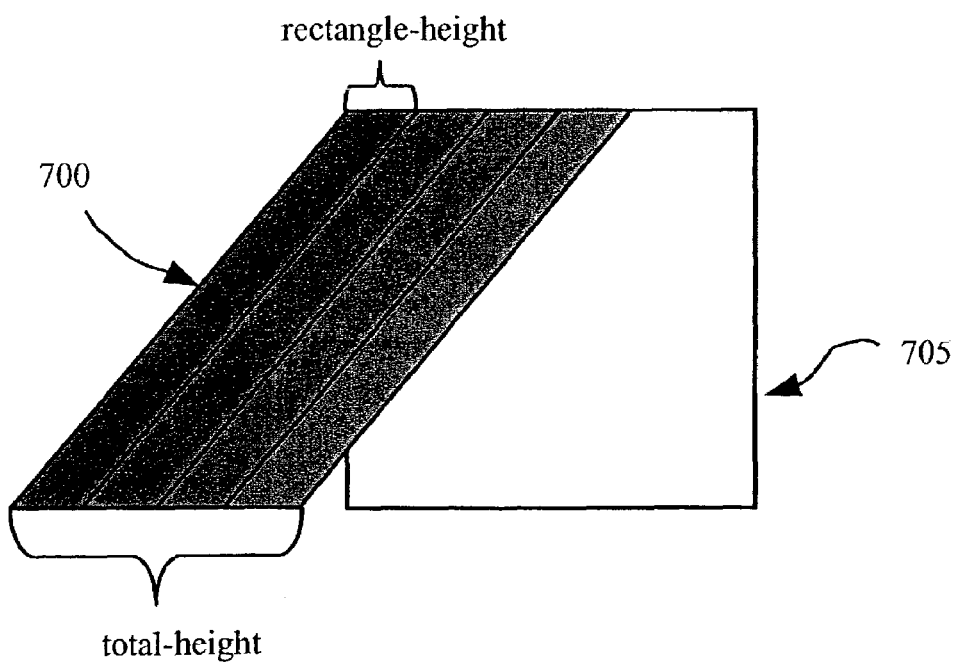

There are two different types of height that are referred to in the present description, those being rectangle-height and total-height. Depending on how the currently stored gradient fill is oriented the heights are defined differently. FIGS. 7A and 7B illustrate the definitions of these different heights and how they differ depending on the orientation of a gradient fill. FIG. 7A shows fill-paths 700 in the form of parallelograms proceeding in a vertical direction and a bounding box 705 of a clipping object (not shown). In the case of vertical fill-paths (eg. FIG. 7A), the rectangle-height of a fill-path is defined as the length of the side of the parallelogram constituting the fill-path, in the y co-ordinate direction. In the case of vertical fill-paths (eg. FIG. 7A), the total-height at an n-th fill-path is defined as the sum of the rectangle-heights of the n-th fill-paths in the y co-ordinate direction. In the case of horizontal fill-paths (eg. 7B), a similar definition applies, however the lengths are measured in the x co-ordinate direction. Also, as will become apparent, the rectangle-height may differ from fill-path to fill-path.

Figure 8A:
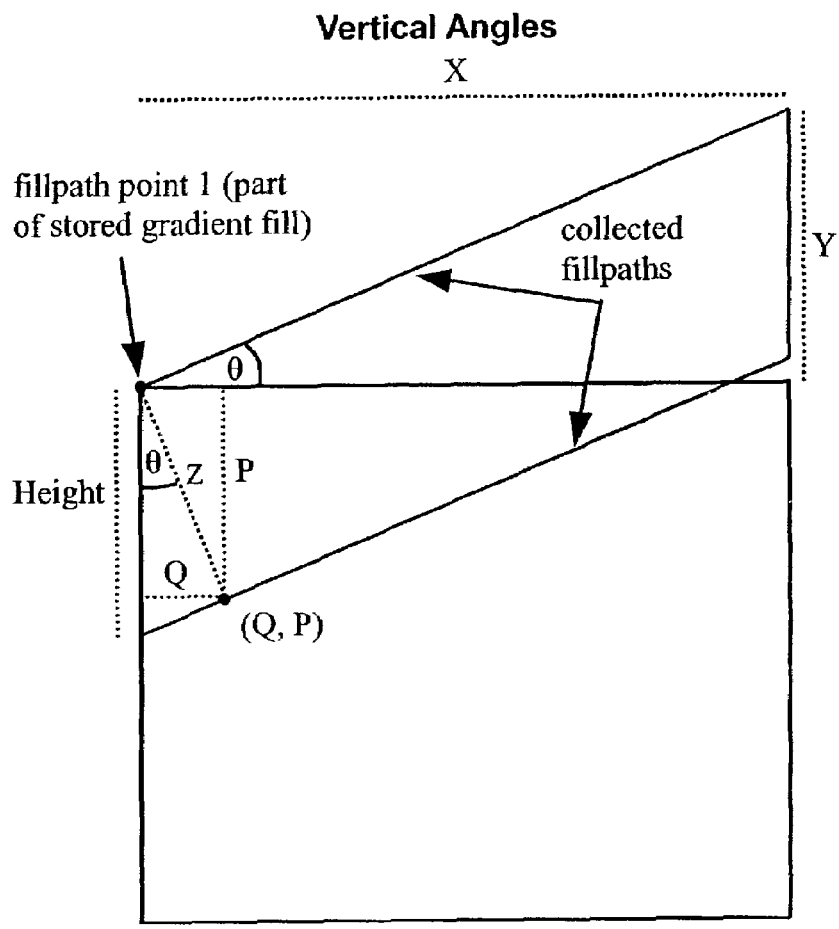
FIGS. 8A and 8B show the lines used in the determination of the second point (Q, P) of a gradient fill.
Figure 8B:
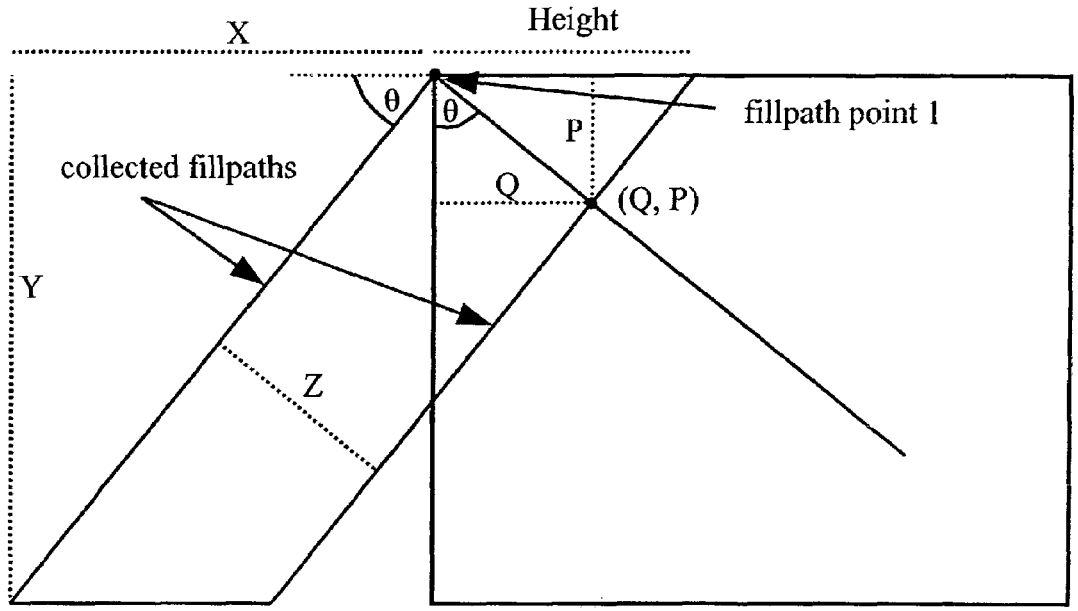

When defining a linear gradient fill from individual fill-paths, the intermediate edge format accepts the color values and positions of two reference points on a line parallel to the gradient of the blend to define the gradient fill. FIGS. 8A and 8B shows the equations used to find the second reference point (Q,P), which is used in defining the gradient fill. The first reference point ("fill-path point 1" as illustrated) is already known. FIG. 8A depicts the vertical angles associated with collected fill-paths inclined at an angle (θ) and which transverse length (X). The angle (θ) is determined from:

$$\theta = \arctan\left(\frac{Y}{X}\right)$$

where X and Y are coordinates along the fill-path. Where the height (Height) of the fill-path is known, a width (Z) of the fill-path maybe calculated from:

$$Z = \text{Height} \cdot \cos(\theta).$$

The width (Z) establishes a point (P, Q) on a fill-path where the distances from the fill-path point 1 can be determined as:

$$P = Z \cdot \cos(\theta)$$

$$Q = Z \cdot \sin(\theta)$$

By substitution, these distances can be determined in terms of the angle (θ):

$$P = \text{Height} \cdot \cos^2\left(\arctan\left(\frac{Y}{X}\right)\right)$$

$$Q = \text{Height} \cdot \sin\left(\arctan\left(\frac{Y}{X}\right)\right) \cdot \cos\left(\arctan\left(\frac{Y}{X}\right)\right)$$

Similarly, for the horizontal angles shown in FIG. 8B, the following equations also may be derived:

$$\theta = \arctan\left(\frac{Y}{X}\right)$$

$$Z = \text{Height} \cdot \sin(\theta)$$

$$P = Z \cdot \cos(\theta)$$

$$Q = Z \cdot \sin(\theta)$$

$$P = \text{Height} \cdot \cos\left(\arctan\left(\frac{Y}{X}\right)\right) \cdot \sin\left(\arctan\left(\frac{Y}{X}\right)\right)$$

$$Q = \text{Height} \cdot \sin^2\left(\arctan\left(\frac{Y}{X}\right)\right)$$

Figure 22:
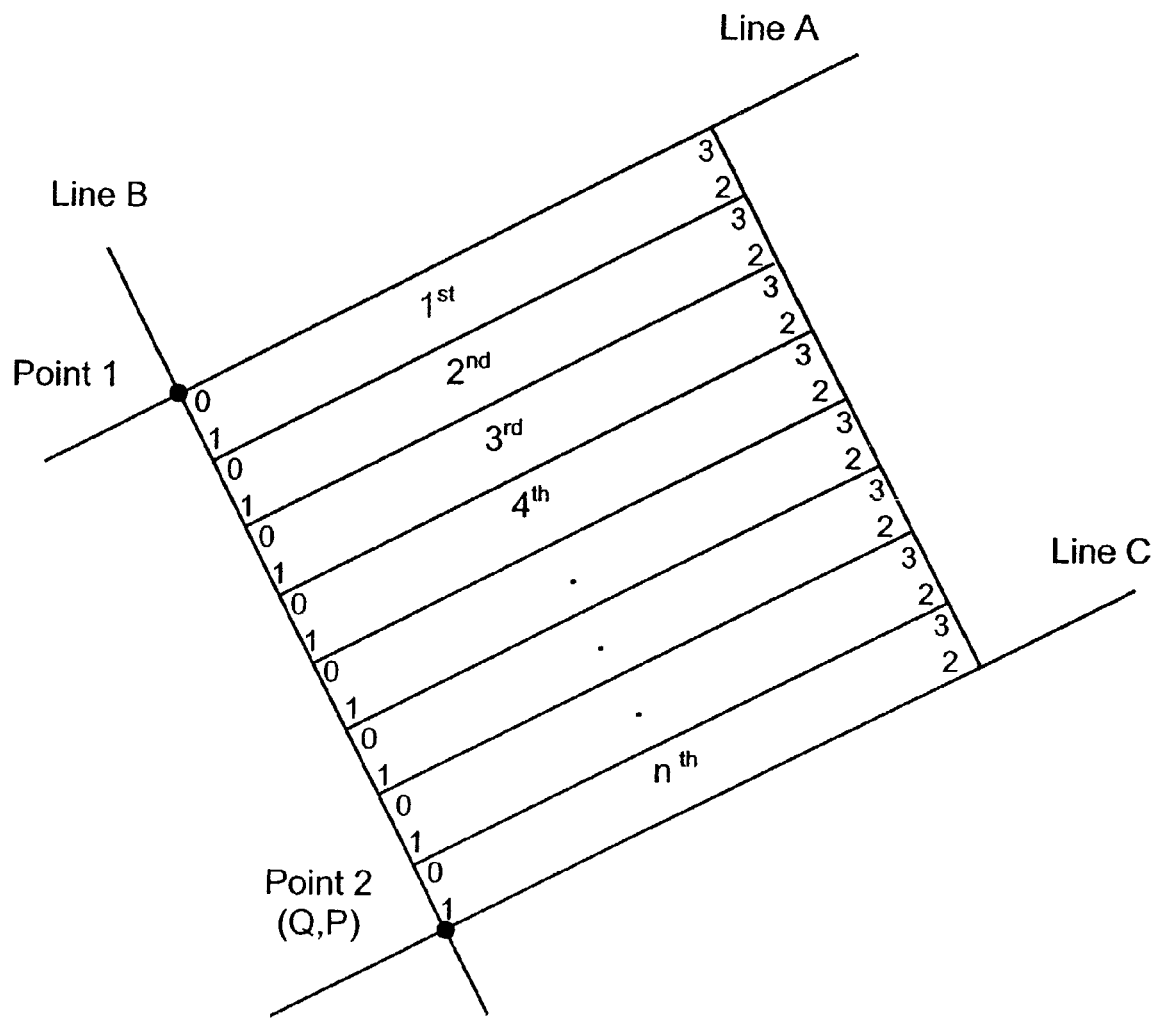
FIG. 22 is an illustration similar to FIGS. 8A and 8B but applicable to the alternate method of FIG. 18.
Figure 23A:
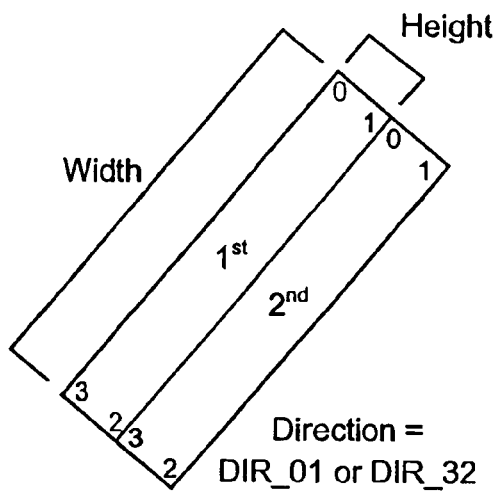
FIGS. 23A to 23D depict approaches for defining a direction of blend similar to FIGS. 5A to 5D and 6A to 6D but applicable to the alternate method of FIG. 18.
Figure 23B:
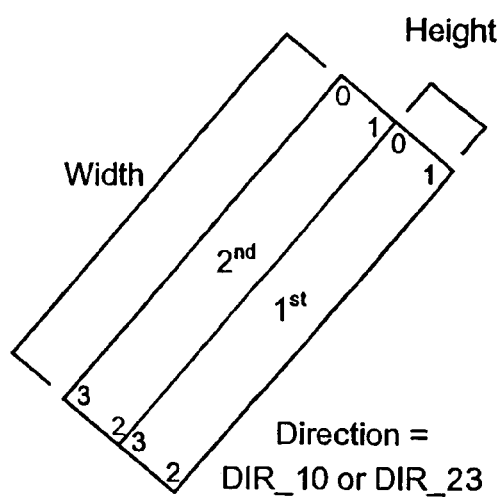
Figure 23C:
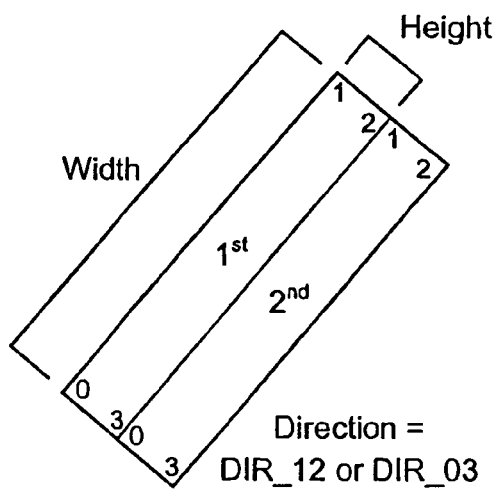
Figure 23:
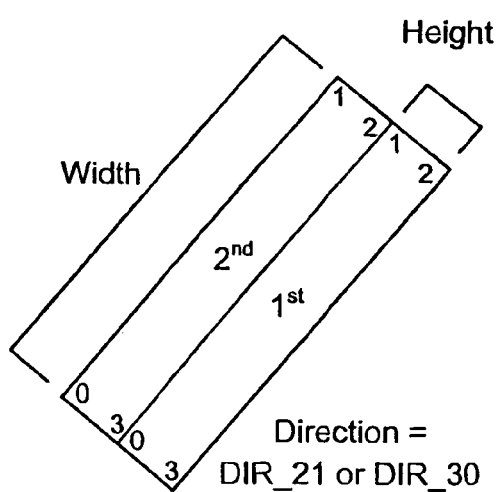

FIG. 22 shows the two reference points, Point 1 and Point 2 (Q, P) and the lines used in the calculation of the two reference points for an alternate method. The first point, Point 1, is simply the first point described in the direction of the fill. The second point, (Q, P) is determined from the intersection of line B and line C. Line C is the line that runs coincidently over the length of the far end of the last fill-path in the gradient fill. Line B is the line 90 degrees to line A that runs through point 1 of the gradient fill.

The direction in which a gradient fill travels can be described by any one of four directions. These directions are named after the alignment of the points that make up the fill-paths within a gradient fill. The four directions are defined as follows:

DIR_01 (or DIR_32)

DIR_10 (or DIR_23)

DIR_12 (or DIR_03)

DIR_21 (or DIR_30)

FIGS. 23A to 23D respectively illustrate the aforementioned definitions of the direction in which a diagonal gradient fill may travel. Each direction has an alternative name, that can be used interchangeably. If a fill-path is deemed not aligned with an adjacent fill-path then no (ie. a NULL) direction is assigned. Having no direction means that gradient fill will not be created, or the new fill-path will not be accepted as part of the current gradient fill.

There are two different types of height that are referred to in the description, rectangle-height (or the height of a fill-path) and total-height. The total-height is defined as the sum of the individual rectangle heights of each of the fill-paths in the currently stored list of fill-paths. The side of the fill-path that defines the rectangle-height of a gradient fill is dependent on which direction the gradient fill is travelling. FIGS. 23A to 23D show that for a direction of DIR_01 the rectangle-height is defined as the length of the line between point 0 and point 1 of a fill-path. For a direction of DIR_10 the rectangle-height is defined as the length of the line between point 1 and point 0. For a direction of DIR_12 the rectangle-height is defined as the length of the line between point 1 and point 2. For a direction of DIR_21, the rectangle-height is defined as the length of the line between point 2 and point 1. Also, it will become apparent that the fill-path heights may differ from fill-path to fill-path. The widths of each of the fill-paths is also shown in FIGS. 23A to 23D.

The term "stored color gradient" is defined as the color gradient between the most recently added fill-path and the second most recently added fill-path in the currently stored gradient fill. The value of this color gradient is stored so that any new fill-paths can be checked to ensure that its color gradient is within a reasonable limit of the stored color gradient.

The currently stored gradient fill is a dynamic list of fill-paths. For each of the fill-paths added to the currently stored gradient fill, 3 arrays are defined by the method as follows:

1. A color array holds the values of each color of the fill-path, where color[n]=the color of fill-path(n);
2. A heights array holds the values of the accumulated heights of the fill-paths, where heights[n]=the sum of the values of rectangle-heights of fill-paths(1) to fill-paths(n). This is also the current value of total-height at fill-path(n); and
3. A points array holds the values of the points of the individual fill-paths, where points[n]=the 4 points in x,y co-ordinates of the parallelogram defining the boundary of fill-path(n).

The phrase "stored gradient fill" refers to the variables necessary for describing the gradient fill currently being tracked. This includes the aforementioned color array, point array and heights array, the number of fills in the gradient fill, the direction of the gradient fill, and the color gradient between the first two colors in the gradient fill.

2.0 Overview

The method receives in turn the fill-paths from the GDI layer and adds those paths to the currently stored gradient fill depending upon certain criteria being met. Initially, the method checks whether the difference in color between a newly received fill-path and the fill-path that was most recently added to the currently stored gradient fill is greater than a reasonably large error factor. Preferably, this error factor is 2 times the difference in color between the 2 most recently added fill-paths of the currently stored gradient fill. Specifically, the method checks, for each color channel (e.g. RGB) of the image being generated, whether a color channel value $C_n$ of the newly received fill-path satisfies one of the following formulae:

$$0 < C_n - C_{n-1} \leq 2(C_{n-1} - C_{n-2}) \text{ if } C_n > C_{n-1}$$

$$-2(C_{n-1} - C_{n-2}) \leq C_n - C_{n-1} \leq 0 \text{ if } C_n \leq C_{n-1} \qquad \text{Equation (1)}$$

where $C_{n-1}$ and $C_{n-2}$ are the corresponding color channel values of the 2 most recently added fill-paths of the currently stored gradient fill.

If the check returns true for each color channel, the method adds the newly received fill-path to the currently stored gradient fill and repeats these operations for the next received fill-path. Otherwise, if the check returns false for any one of the color channels, then the method undertakes to generate one or more linear blends from the color and position of the first fill-path of the currently stored gradient fill to the color and position of the most recently added fill-path of the currently stored gradient fill. In other words, the method continues adding fill-paths to the currently stored gradient fill until a fill-path is reached that no longer satisfies the aforementioned criteria. This occurs when one of the color channels for the next fill-path causes a significant change in direction for the current color channel's gradient. For example, this will occur when the direction of the color gradient changes sign.

As mentioned previously, if the check returns false, the method undertakes to generate one or more linear blends from the fill-paths already added to the currently stored gradient fill Specifically, the method determines an optimal set of linear blends fitting the set of fill-paths in the currently stored gradient fill. The method achieves this in the following manner.

Firstly, for the purposes of explanation, it is assumed that the currently stored gradient fill contains n fill-paths denoted as fill-path[1] through to fill-path[n], where fill-path[1] is the first fill-path added to the currently stored gradient fill and fill-path[n] is the last fill-path added to the currently stored gradient fill.

The method generates the set of linear blends fitting the fill-paths of currently stored gradient fill by first testing whether the color gradients between fill-path[1] and fill-path[n] are not equal to the corresponding color gradients between fill-path[1] and mid-point fill-path[n/2] (within some acceptable error). If the test returns true, that is, if it is not equal, then the method then partitions the set of fill-paths into 2 sets, one for the first half of the fill-paths (fill-path[1] ... fill-path[n/2]) and one for the second half of the fill-paths (fill-path[n/2] ... fill-path[n]) and repeats the test for each of these new sets of fill-paths. On the other hand, if the test returns false, that is the color gradients between fill-path[1] and fill-path[n] are equal (within some acceptable error) to the corresponding color gradients between fill-path[1] and fill-path[n/2] for some set of fill-paths[1 ... n], then the method outputs a linear ramp call to the graphics rendering system for this set of fill-paths[1 ... n], using the colors array to define the start and end colors of the linear ramp, and the points array to define the area to be filled. This step can be implemented as a software module, which can-be defined recursively as:

Function find_and_put_ramps(C[1 ... n], H[1 ... n], P[1 ... n])

1. If $\left| \frac{G_n - G_{n/2}}{G_n} \right| > E_0$  Equation(2)

for any one color channel where $G_{n/2} = \frac{C_{n/2} - C_1}{H_{n/2} - H_1}$ $G_n = \frac{C_n - C_1}{H_n - H_1}$ $H_n$, $H_{n/2}$ are the values of the accumulated rectangle-heights of fillpaths 1 to n and 1 to n/2 respectively, $C_n$ is the value of the color channel of the n-th fill-path, $E_0$ is a threshold constant, preferably 0.1, and where $C_1$ and $H_1$ are the values of the color channel and rectangle height respectively of the first fill-path in the set [1 ... n] passed to the function.

2. Call find_and_put_ramps(C[1 ... n/2], H[1 ... n/2], P[1 ... n/2])
3. Call find_and_put_ramps(C[n/2 ... n], H[n/2 ... n], P[n/2 ... n])
4. EndIf
5. Put LinearRamp from C1 to Cn End Function As can be seen, the method when partitioning the set of fill-paths, preferably uses the fill-path at the midpoint as both the end point of the first ramp and the start point of the second ramp. This ensures a smooth blend between adjacent linear ramps and eliminates Mach Banding when compared to previous implementations. Alternatively, traditional partitioning based upon (n/2) and (n/2)+1 may be used.

Turning now to FIGS. 9A to 9C, there is shown the values of a color channel of an exemplary set of fill-paths added to the currently stored gradient fill for the purposes of illustrating the method of generating one or more linear blends. FIGS. 9A to 9C illustrate the color values in the y co-ordinate direction of the fill-paths 1 to 11, which are depicted in the x co-ordinate direction. The symbol C represents the value of the color channel of a fill-path, whereas the symbol H represents the value of the accumulated height, e.g total-height, of all the stored fillpaths. For simplicity, there is assumed to be only one color channel. As will be apparent, the fill-paths 1 ... 10 are added to the currently stored gradient fill in turn, until the fill-path 11 is received from the GDI layer. As can be seen this fill-path 11 fails the criteria set out in Equation (1), and is not added to the currently stored gradient fill. The method then generates one or more linear blends from the fill-paths 1 ... 10 already stored in the currently stored gradient fill in the following manner.

The preferred method compares the color gradient between fill-paths 1 ... 10 with the color gradient between fill-paths 1 ... 5 in accordance with Equation (2). This comparison also ensures that n is not below a predefined value. For the sake of simplicity this is ignored in this example. This comparision is illustrated in FIG. 9A. The output of this comparision is in this case greater than the threshold constant $E_0$=0.1, so the method divides the set of fill-paths[1 ... 10] into 2 sets: fill-paths[1 ... 5] and fill-paths[5 ... 10].

The method then compares the color gradient between fill-paths 1 ... 5 with the color gradient between fill-paths 1 to 3 in accordance with Equation (2). Note, where n is odd, the value n/2 is incremented to the next nearest highest integer, which in this case is three (3). This comparision is illustrated in FIG. 9B. The output of this comparison is in this case less than the threshold constant $E_0$=0.1, so a linear blend is output for fill-paths 1 to 5.

The method then compares the color gradient between fill-paths 5 to 10 with the color gradient between fill-paths 5 to 7, in accordance with Equation (2). Note, in this particular case the first fill-path in the set is fill-path 5 and the gradients are measured from this fill-path. This comparision is illustrated in FIG. 9C. The output of this comparison is in this case greater than the threshold constant $E_0$=0.1, so the method divides the set of fill-paths[5 ... 10] into 2 sets: fill-paths[5 ... 7] and fill-paths[7 ... 10].

The method then compares the color gradient between fill-paths 5 to 7 with the color gradient between fill-paths 5 to 6 in accordance with Equation (2). This comparision is illustrated in FIG. 9C. The output of this comparison is in this case less than the threshold constant $E_0$=0.1, so a linear blend is output for 5 to 7. In a similar fashion, the method determines the color gradient between fill-paths 7 and 8 is similar to the color gradient between fill-paths 7 and 10, so a linear blend is output for fill-paths 7 and 10. The method then terminates.

As can be seen, the method breaks the whole stored gradient fill into pieces depending on the linearity of the overall gradient fill and not simply those portions that have been processed to date. This ensures that the entire gradient fill is considered when determining the optimal set of linear blends, thus ensuring the best possible match is made to the original gradient fill with the least number of linear ramps. This method identifies the larger constant slopes within a gradient fill and outputs them accordingly. In this way, the method enables the reduction of the number of graphic objects needed to be rendered. Furthermore, Mach Banding is avoided by setting the midpoint of the partitioning as both the endpoint of the first ramp and the start point of the second ramp.

As mentioned previously, the method receives in-turn the fill-paths from the GDI layer and adds these to the currently stored gradient fill depending on whether the newly recieved fill-path meets the criteria as set out in Equation (1). In the case where this criteria is not met, the newly received fill-path is not stored in the currently stored gradient fill and the method then processes the already existing fill-paths in the currently stored gradient fill to produce one or more linear blends. Preferably, the newly received fill-path should also meet a number of other criteria in addition to the criteria specified in Equation(1) before it is added to the currently stored gradient fill. For example, the rectangle-height of the newly received fill-path should be less than or equal to two times the rectangle-height of the first fill-path in the currently stored gradient fill in order for the newly received fill-path to be added to the currently stored gradient fill. Otherwise, if the newly received fill-path is added to the currently stored gradient fill, then discontinuities in the blend will become apparent to the eye. Further criteria will be described below in more detail.

3.0 First Method

Figure 10:
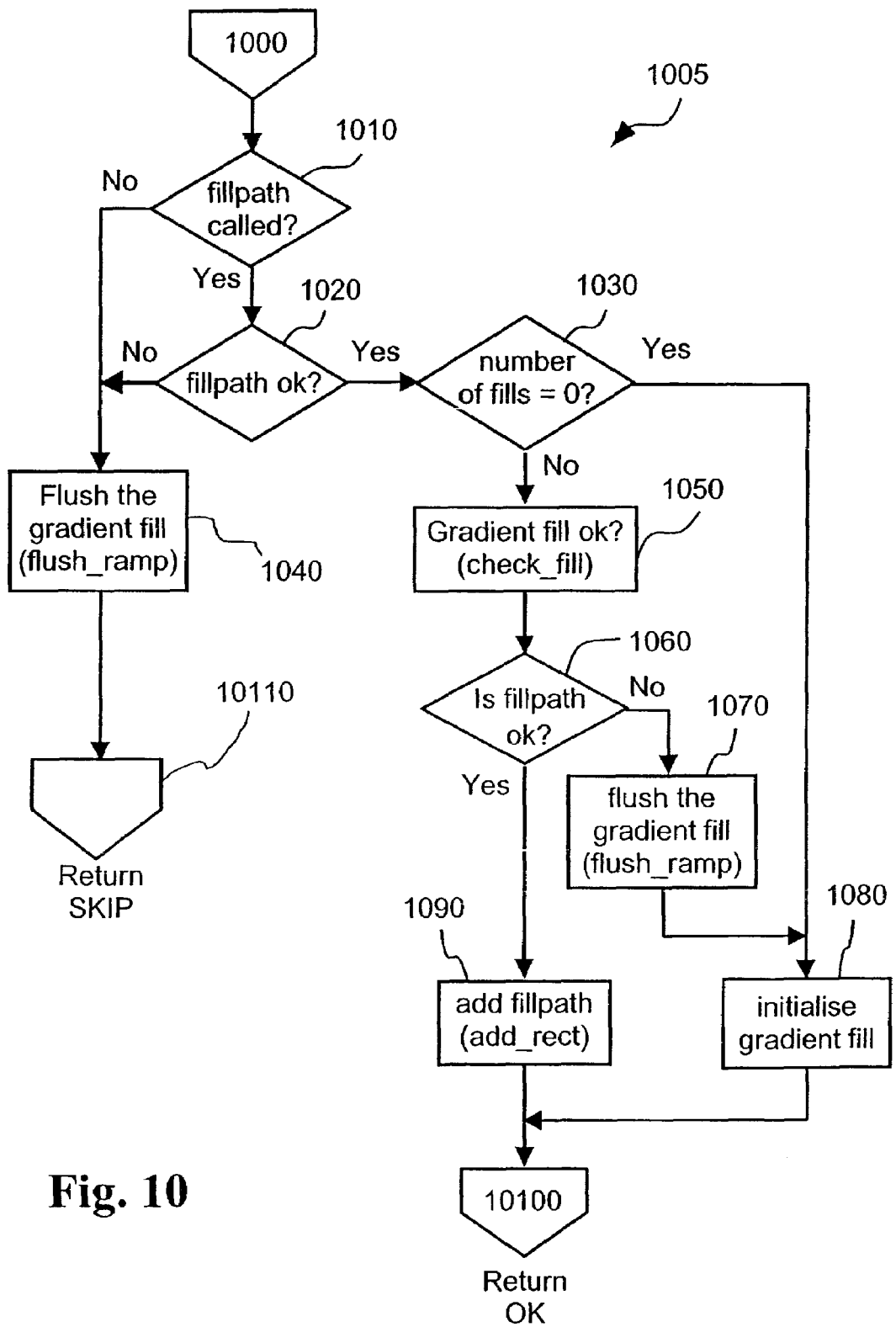
FIG. 10 shows a flow chart of a first method of generating one or more linear blends.

Turning now to FIG. 10, there is shown a flow chart of a method 1005 of generating one or more linear blends. As mentioned previously, the method 1005 is implemented as a software module for execution on a processor of a general-purpose computer. Such a general-purpose computer suitable for implementing the preferred method is described below with reference to FIG. 17. The software module is preferably a part of a first stage of a graphics rendering system that interfaces to a graphics device interface (GDI) layer and receives graphics objects for a page, converting each graphics object to an intermediate edge-based format. In the second stage of the graphics rendering system, the job is rendered and the resulting pixels are output to a downstream device, such as a printer or graphics card. Preferably, both stages of the graphics rendering system are implemented as a graphics rendering software application for execution on the processor of the computer. Any known graphics rendering software application would be suitable, with appropriate modifications for interfacing with the software module implementing the method 1005.

The method 1005 commences operation at step 1000 when it is called by the first stage of the graphics rendering system. The method 1005 is called when the graphics rendering system receives a new graphics object from the GDI layer. After this step 1000, the method 1005 then inputs at step 1010 the graphics object currently being passed to the graphics rendering system. The method 1005 also during this step 1010 checks whether the currently received graphic object is a fill-path. If this step 1010 determines that the currently received graphic object is not a fill-path, then the method 1005 proceeds to step 1040, where a sub-process named flush_ramp 1505 is called. The sub-process flush-ramp 1505 processes any fill-paths already stored in the currently stored gradient fill to produce one or more linear blends, which are then passed to the graphics rendering system. After the generation of the linear blends, the flush_ramp sub-process 1505 empties the stored gradient fill. This sub-process flush_ramp 1505 will be described in more detail below with reference to FIG. 15.

After completion of step 1040, the method 1005 terminates 10110 and returns to the first stage of the graphics rendering system a message SKIP, which tells it that the currently received object is not a valid fill-path. The first stage of the graphics rendering system then tries to convert this fill-path to an edge based format if possible, otherwise the object is skipped and the system proceeds to the next object. As will be apparent from the foregoing, the currently received graphic object is not a valid fill-path and need not be pre-processed by the method 1005 before conversion to an intermediate edge based format.

Otherwise, if the step 1010 determines that the currently received graphic object is a fill-path, the method 1005 proceeds to step 1020. The method 1005 in step 1020 checks whether the currently received fill-path has the basic properties needed to form a gradient fill. In particular, step 1020 tests whether the currently received fill-path: has one side that is at least smaller than a predefined configurable maximum size; is being filled with a flat color; contains 4 points that define a parallelogram; and does not use a raster operation that requires a destination. If the currently received fill-path meets these criteria then, the method 1005 proceeds to step 1030. Otherwise, if the fill-path does not meet the criteria then the method 1005 proceeds to step 1040, where a sub-process named flush_ramp 1505 is called.

The method 1005 then checks at step 1030 whether the number of fill-paths in the currently stored gradient fill is currently zero. If the method 1005 determines that currently stored gradient fill contains zero fill-paths, then the method 1005 proceeds to step 1080. During step 1080, the method 1005 initializes a new gradient fill by adding the currently received fill-path to the currently empty stored gradient fill. The height of the fill-path is not yet known because a direction has not yet been determined. A direction is defined when a second fill-path is received, this means the height for the first fill-path can only be added when a second fill-path is determined to be part of a gradient fill with the first fill-path. The height for the first fill-path is added to the stored gradient fill during an add_rect sub-process 1105, called at step 1090. Otherwise, if the number of fill-paths in the currently stored gradient are greater than zero, then the method 1005 proceeds to step 1050.

The method 1005 in step 1050 calls a sub-process named check_fill 1205 to determine whether the currently received fill-path should be added to the currently stored gradient fill. The check_fill sub-process 1205 returns true if the fill-path is to be added to the currently stored gradient fill, otherwise it returns false, if it is not to be added. This check_fill sub-process 1205 is described below in detail with reference to FIG. 12.

After completion of step 1050, the method 1005 proceeds to step 1060, which determines whether a true or false has been returned by the check_fill sub-process 1205. If the step 1060 determines a true has been returned, the method 1005 proceeds to step 1090 where the currently received fill-path is added to the currently stored gradient fill. The method 1005 during step 1090 calls the sub-process named add_rect 1105 in order to add the currently received fill-path to the currently stored gradient fill. This sub-process add_rect 1105 is described below in more detail with reference to FIG. 11. Otherwise if a false has been returned, the method 1005 proceeds to step 1070.

The method 1005 during step 1070 calls the aforementioned sub-process flush_ramp 1505 for processing the currently stored gradient fill. After the completion of step 1070, the method 1005 then proceeds to step 1080, where a new gradient fill is initialized by adding the currently received fill-path to the currently empty stored gradient fill.

After completion of steps 1080 or 1090 the method 1005 terminates 10100. When the method 1005 terminates, it returns a parameter OK to the first stage of the graphics rendering system, telling that it does not need to convert and pass the fill-path on to the second stage of the graphics rendering system.

3.1 add_rect Sub-Process

Figure 11:
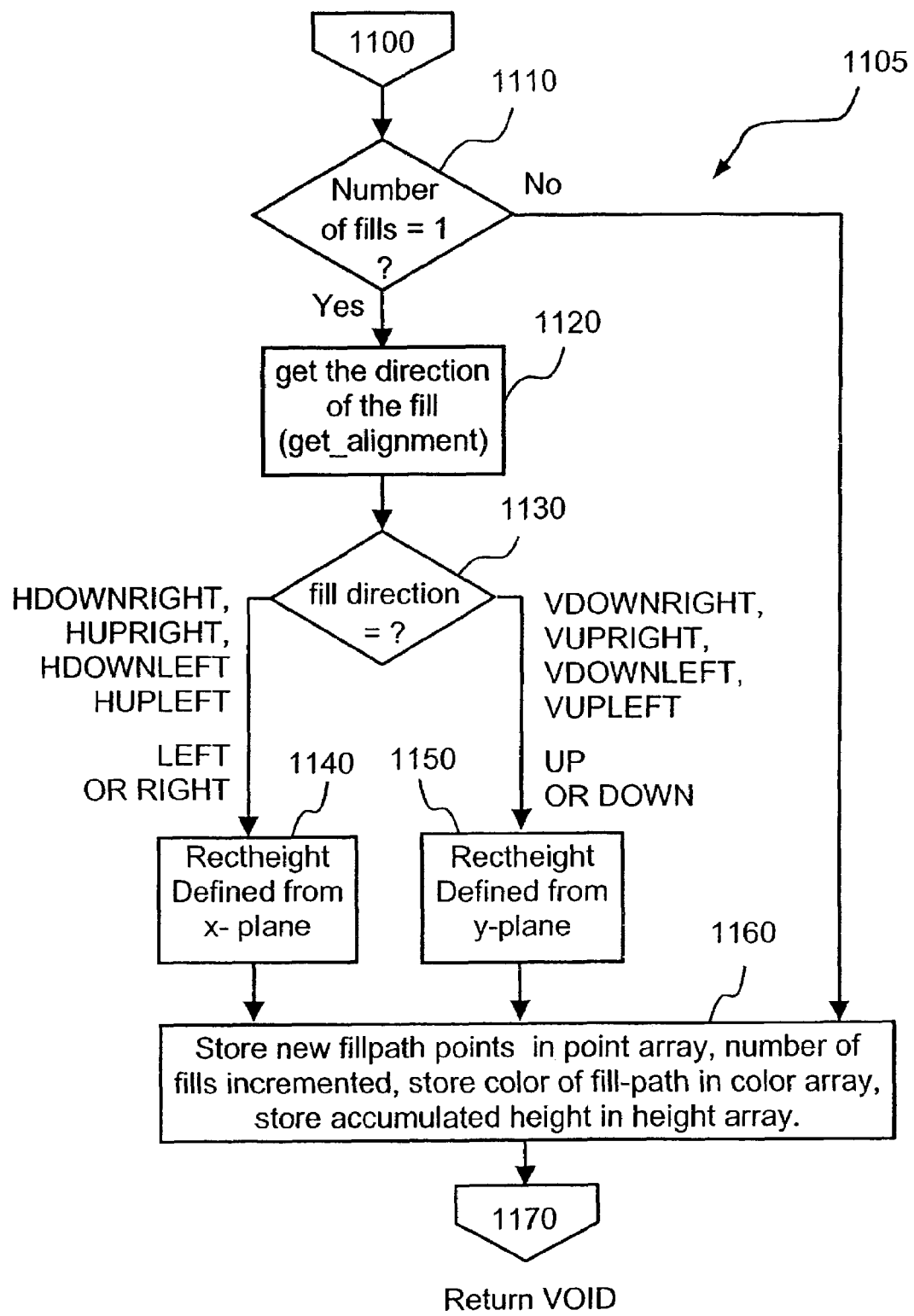
FIG. 11 shows a flow chart of the add_rect sub-process called by the method of FIG. 10.

Turning now to FIG. 11, there is shown a flow chart of the add_rect sub-process 1105 called by the method 1005 of FIG. 10. This add_rect sub-process 1105 is responsible for adding a new fill-path to the currently stored gradient fill, which already contains one or more fill-paths. The add_rect sub-process 11 05 commences at step 1100 when it is called by step 1090 (FIG. 10) of the method 1005. Step 1090 also passes to this add_rect sub-process 1105 the currently received fill-path for adding to the currently stored gradient fill.

After step 1100, the add_rect sub-process 1105 proceeds to step 1110, where the number of fill-paths in the currently stored gradient fill is checked. If this step 1110 reveals there is only one fill-path in the currently stored gradient fill then the add_rect sub-process 1105 proceeds to step 1120, where the direction of the fill of the currently received fill-path is determined (eg. VDOWNRIGHT). This is achieved by calling a sub-process named get_alignment 1495. This get_alignment sub-process 1495 will be described in more detail below with reference to FIG. 14. Otherwise, if there are more than one fill-path in the currently stored gradient fill, the add_rect sub-process 1105 proceeds directly to step 1160.

After the direction of the fill has been determined in step 1120, the add_rect sub-process 1105 proceeds to step 1130. In step 1130, a switch statement is used to separate the directions into horizontal (HDOWNRIGHT, HUPRIGHT, HDOWNLEFT, or HUPLEFT) and vertical (VDOWN-RIGHT, VUPRIGHT, VDOWNLEFT, or VUPLEFT) ramps. If the ramp is a horizontal ramp then step 1140 is performed where the rectangle-height of the first fill-path in the currently stored gradient fill and the received fill-path is defined by the x-plane (see FIG. 7B). The height of the first fill-path is then stored in the currently stored gradient fill. Otherwise if the ramp is vertical, then step 1150 is performed where the rectangle-height of the first fill-path in the currently stored gradient fill and the currently received fill-path is defined by the y-plane (see FIG. 7A). The height of the first fill-path is then stored in the currently stored gradient fill.

After the completion of steps 1140, or 1150 the add_rect sub-process 1105 proceeds to step 1160, where the accumulated height of this fill-path and all the previous fill-paths, if any, is stored in the heights array. The color of the currently received fill-path is added to the color array, and the number of fills is also incremented. The point array is also updated to hold the points of the currently received fill-path. After completion of step 1160, the add_rect sub-process 1105 terminates at step 1170 and returns to step 10100 of the method 1005.

3.2 check_fill Sub-Process

Figure 12:
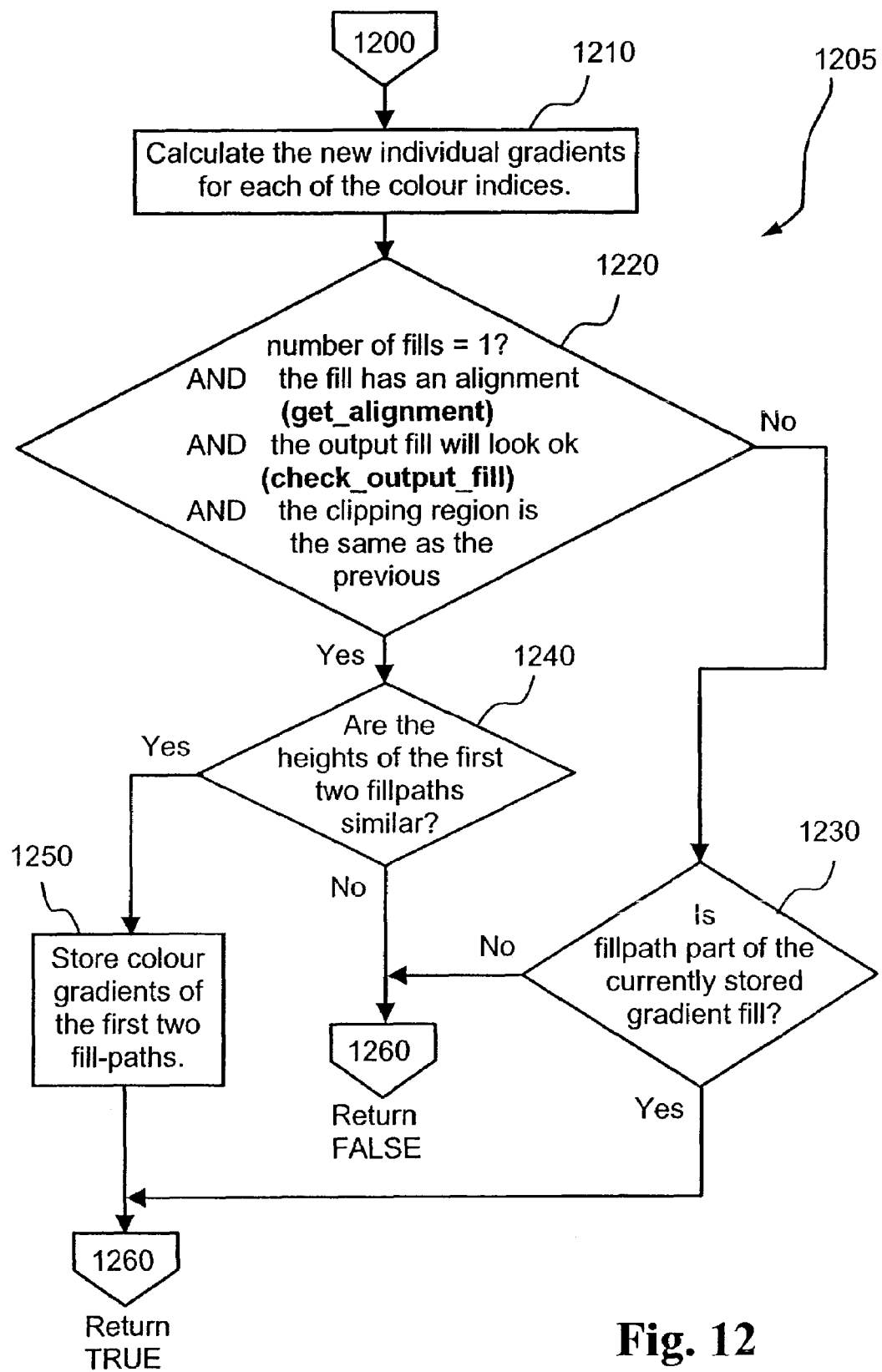
FIG. 12 shows a flow chart of the check_fill sub-process called by the method of FIG. 10.

Turning now to FIG. 12, there is shown a flow chart of the check_fill sub-process 1205 called by step 1050 of the method 1005 of FIG. 10. This check_fill sub-process 1205 is responsible for checking whether the currently received fill-path is suitable for adding to the currently stored gradient fill. The check_fill sub-process 1205 commences at step 1200 when it is called by step 1050 (FIG. 10) of the method 1005. Step 1050 also passes to this check_fill sub-process 1205 the currently received fill-path.

After step 1200, the check_fill sub-process 1205 proceeds to step 1210. The check_fill sub-process 1205 at step 1210 calculates the difference (i.e. $C_n - C_{n-1}$) between the color of the currently received fill-path and the color of most recently added fill-path to the currently stored gradient fill for each of the RGBA/CMYK (depending on the color space used) color values. The color of the most recently added fill-path in the stored gradient fill is the color stored in the last position of the color array. After completion of step 1210, the check_fill sub-process 1205 proceeds to step 1220.

The check_fill sub-process 1205 during step 1220 first tests to see if there is only one fill-path stored in the current gradient fill. Secondly, it tests that the currently received fill-path is aligned with the currently stored gradient fill. Thirdly, it tests if the fill-path in the currently stored gradient fill together the currently received fill-path will look correct by calling a sub-process named check_output_fill 1305. Fourthly and lastly, it tests if the new fill-path has the same clipping region and raster operation as the previously added fill-paths in the currently stored gradient fill. This check_output_fill sub-process 1305 is described below in more detail with reference to FIG. 13. If all these tests are met in the affirmative the check_fill sub-process 1205 then proceeds to step 1240. Otherwise, if any one of these tests are not met, then the check_fill sub-process 1205 proceeds to step 1230. It should be noted that the check_fill sub-process 1205 evaluates each one of the tests in turn and if a test is not met in the affirmative then the check_fill sub-process 1205 immediately proceeds to step 1230 without evaluating the following tests. For example, if there is only one fill-path in the currently stored gradient fill, and the fill is aligned, then the first and second tests are met and third test then calls the check_output_fill sub-process 1305. On the other hand for example, if there are more than one fill-paths in the currently stored gradient fill, then the check_fill sub-process 1205 immediately proceeds to step 1230 without evaluating the subsequent tests. Thus the check_output_fill sub-process 1305 is only called when there is a currently received fill-path which is properly aligned and the stored gradient fill contains only one fill-path.

The check_fill sub-process 1205 during step 1240 then checks if the heights of the first two fill-paths are similar. Preferably, it checks this similarity by testing whether the rectangle-height of the currently received fill-path is no greater than two times the rectangle-height of the fill-path in the currently stored gradient fill. It should be noted that during step 1240, there is only one fill-path in the currently stored gradient fill. If the test reveals the heights are similar, the check_fill sub-process 1205 proceeds to step 1250. Otherwise if the test reveals that the two heights are not similar then the check_fill sub-process 1205 terminates 1260 and returns FALSE to step 1050 of the method 1005, indicating that the currently received fill-path should not be added to the currently stored gradient fill.

The check_fill sub-process 1205 during step 1250 stores the color gradients of the two fill-paths that were calculated during step 1210. After step 1250, the check_fill sub-process 1205 terminates 1260 and returns TRUE to step 1050 of the method 1005, so that the method 1005 will then add 1090 the new fill-path to the stored gradient fill (which only contains one fill-path at this moment).

On the other hand, if any one of requirements are not met in step 1220, the check_fill sub-process 1205 proceeds to step 1230. The check_fill sub-process 1205 in step 1230 then checks to see if the currently received fill-path is a suitable candidate to be added to the currently stored gradient fill. The step 1230 does this by checking to ensure that:

1. The number of fills in the currently stored gradient fill is greater than 1;
2. The sum of the accumulated height in the currently stored gradient fill and the rectangle-height of the currently received fill-path is less than a predefined maximum. This predefined maximum can be set to such a value, so that the fill does not extend beyond the page;
3. The color gradient between the currently received fill-path and the most recently added fill-path in the currently stored gradient fill-path has the same sign and is similar to the stored gradient. The gradient is checked for each of the color indices within the color space used (eg. if the color space is RGBA, each of the indicies R, G, B, and are all checked for consistency). Preferably, it checks to ensure that the color channel value $C_n$, for each color channel, of the currently received fill-path satisfies one of the relations of Equation (1) noted above.
4. The currently received fill-path is aligned correctly with the fill-paths in currently stored gradient fill;
5. The currently received fill-path is similar in height (rectangle-height) to the most recently added fill-path in the currently stored gradient fill. Preferably, it checks this similarity by testing whether the rectangle-height of the currently received fill-path is no greater than two times the rectangle-height of the first fill-path in the currently stored gradient fill.
6. The raster operation for the currently received fill-path is the same as the raster operation for the stored gradient fill.
7. The currently received fill-path has the same clip as the stored gradient fill.

If the step 1230 determines that the currently received fill-path passes all the aforementioned checks 1 to 7, then the check_fill sub-process 1205 then terminates 1260 and returns TRUE to step 1050 of the method 1005, so that the method 1005 will then add 1090 the new fill-path to the currently stored gradient fill. Otherwise, if any one of these checks 1 to 7 fail, the sub-process check_fill 1205 terminates at step 1260 and returns FALSE to step 1050 of the method 1005, so that it does not add the currently received fill-path to the currently stored gradient fill.

3.3 check_output_fill Sub-Process

Figure 13:
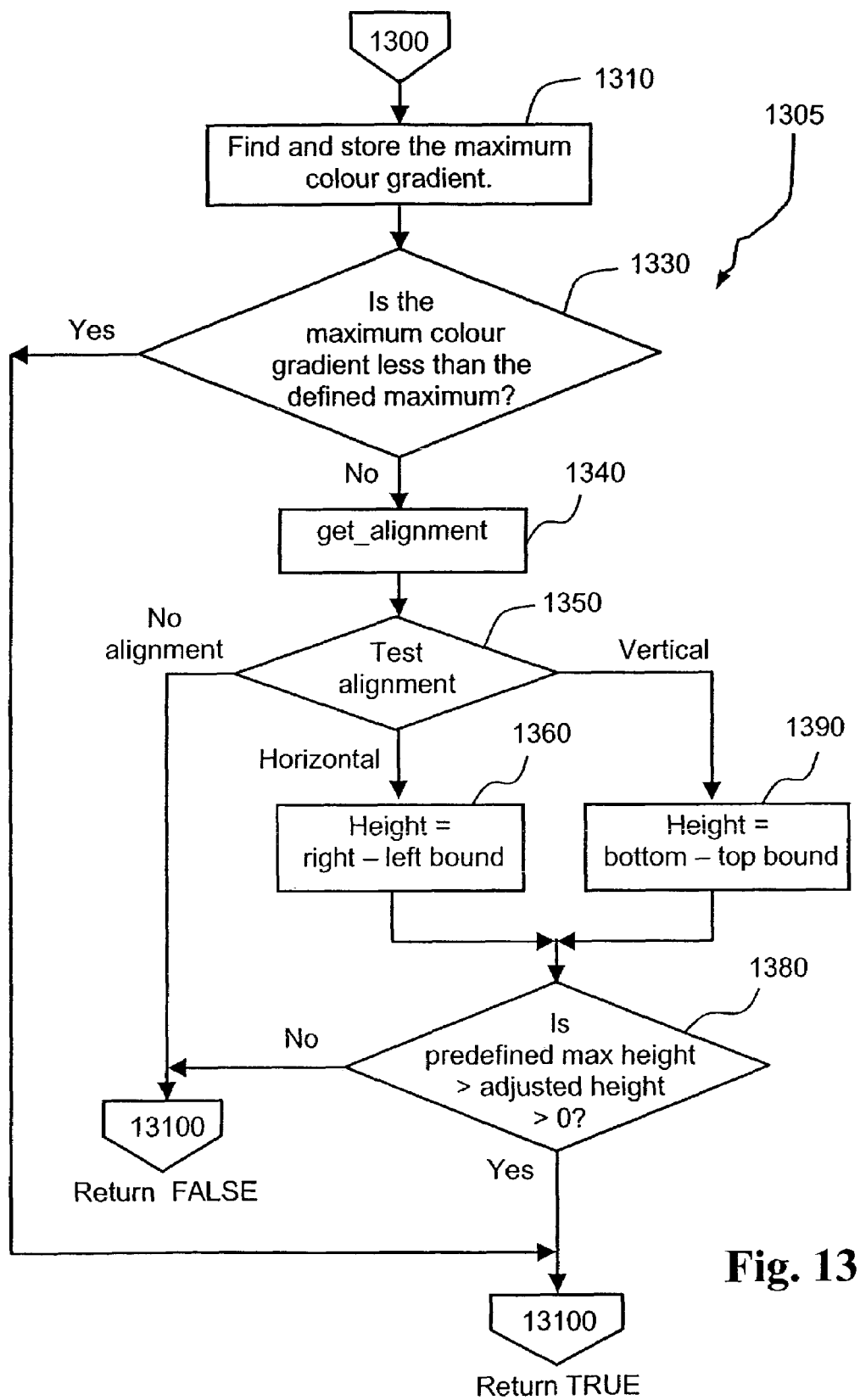
FIG. 13 shows a flow chart of the check_output_fill sub-process called by the check_fill sub-process of FIG. 12.

Turning now to FIG. 13, there is shown a flow chart of the check_output$_{13}$ fill sub-process 1305 called by step 1220 of the check_fill sub-process 1205 of FIG. 12. This check_output_fill sub-process 1305 is responsible for determining that the single fill-path in currently stored gradient fill and the currently received fill-path are suitable for creating a gradient fill. The check_output_fill sub-process 1305 commences at step 1300 when it is called by step 1220 (FIG. 12) of the check_fill sub-process 1205. Step 1220 also passes during step 1300 to this check_output_fill sub-process 1305 the currently received fill-path.

After step 1300, the check_output fill sub-process 1305 proceeds to step 1310. The check_output_fill sub-process 1305 firstly during step 1310 calculates the absolute value of the color difference between the color of the currently received fill-path and the single fill-path in the currently stored gradient fill for each one of the color channels (eg. red, green, blue and alpha). The check_output_fill sub-process 1305 then during step 1310 determines and stores that one of the calculated absolute values of color differences that has the highest value (herein after called the maximum color gradient). After completion of step 1310, the check_output_fill sub-process 1305 proceeds to step 1330.

The check_output_fill sub-process 1305 during step 1330 checks whether the maximum color gradient (calculated during step 1310) is less than a predefined maximum. Preferably, the predefined maximum is 6. if the check 1330 reveals that it is less than the predefined maximum then the check_output_fill sub-process 1305 terminates 13100 and returns TRUE to step 1220 of the check_fill sub-process 1205 (FIG. 12). This tells the check_fill process 1205 (FIG. 12) that the gradient fill should be created. On the other hand if the check 1330 reveals that the maximum color gradient is larger than or equal to the predefined maximum, then the check_output_fill sub-process 1305 proceeds to 1340. In the latter case it is still possible that the gradient fill should be created, that is, if the height of the individual fill-paths is very small, and this is determined during steps 1340-1390.

The check_output_fill sub-process 1305 in step 1340 calls the sub-process named get_alignment 1495 to determine the alignment of the fill-paths. This get_alignment sub-process 1495 returns to the check_output_fill sub-process 1305 the alignment (eg. VDOWNLEFT) of the currently received fill-path and the single fill-path in the currently stored gradient fill. Alter the termination of the get_alignment sub-process 1495 called in step 1340, the check_output_fill sub-process 1305 proceeds to step 1350.

The check_output_fill sub-process 1305 in step 1350 checks the alignment returned by step 1340. If the check 1350 reveals that the direction is not defined at all, that is the get_alignment sub-process 1495 returns NONE, then the check_output_fill sub-process 1305 terminates 13100 and returns FALSE to step 1220 of the check_fill sub-process 1205 indicating that a gradient fill should not be created. If the check 1350 reveals the direction is horizontal, that is the get_alignment sub-process 1495 returns HDOWNLEFT, HUPLEFT, HDOWNRIGHT, or HUPRIGHT, then the check_output_fill sub-process 1305 proceeds to step 1360. Otherwise, if the check 1350 reveals the direction is vertical, that is the get_alignment sub-process 1495 returns VDOWNLEFT, VUPLEFT, VDOWNRIGHT, or VUPRIGHT, then the check_output_fill sub-process 1305 proceeds to step 1390.

The check_output_fill sub-process 1305 during step 1360 sets the rectangle-height of the currently received fill-path to the length of the side of the parallelogram that proceeds in the x co-ordinate direction (See FIG. 7B). On the other hand, the check_output_fill sub-process 1305 during step 1390 sets the rectangle-height of the currently received fill-path to the length of the side of the parallelogram that proceeds in the y co-ordinate direction (See FIG. 7A). After completion of steps 1360 or 1390, the check_output_fill sub-process 1305 proceeds to step 1380.

The check_output_fill sub-process 1305 then in step 1380 checks if the rectangle-height, calculated in step 1360 or 1390, to see if it is below some predefined maximum height and greater than zero. If the check 1380 reveals that it is not then the check_output_fill sub-process 1305 terminates 13100 and returns FALSE to step 1220 of the calling check_fill sub-process 1205. Thus indicating a gradient fill should not be created. On the other hand, if the check 1380 reveals that it is less than the predefined maximum height and greater than zero then the check_output_fill sub-process 1305 terminates 13100 and returns TRUE to step 1220 of the calling check_fill sub-process 1205. Thus indicating that the two fill-paths, that is the currently received fill-path and the single fill-path in the currently stored gradient fill, are potentially suitable for creating a gradient fill.

3.4 get_alignment Sub-Process

Figure 14A:
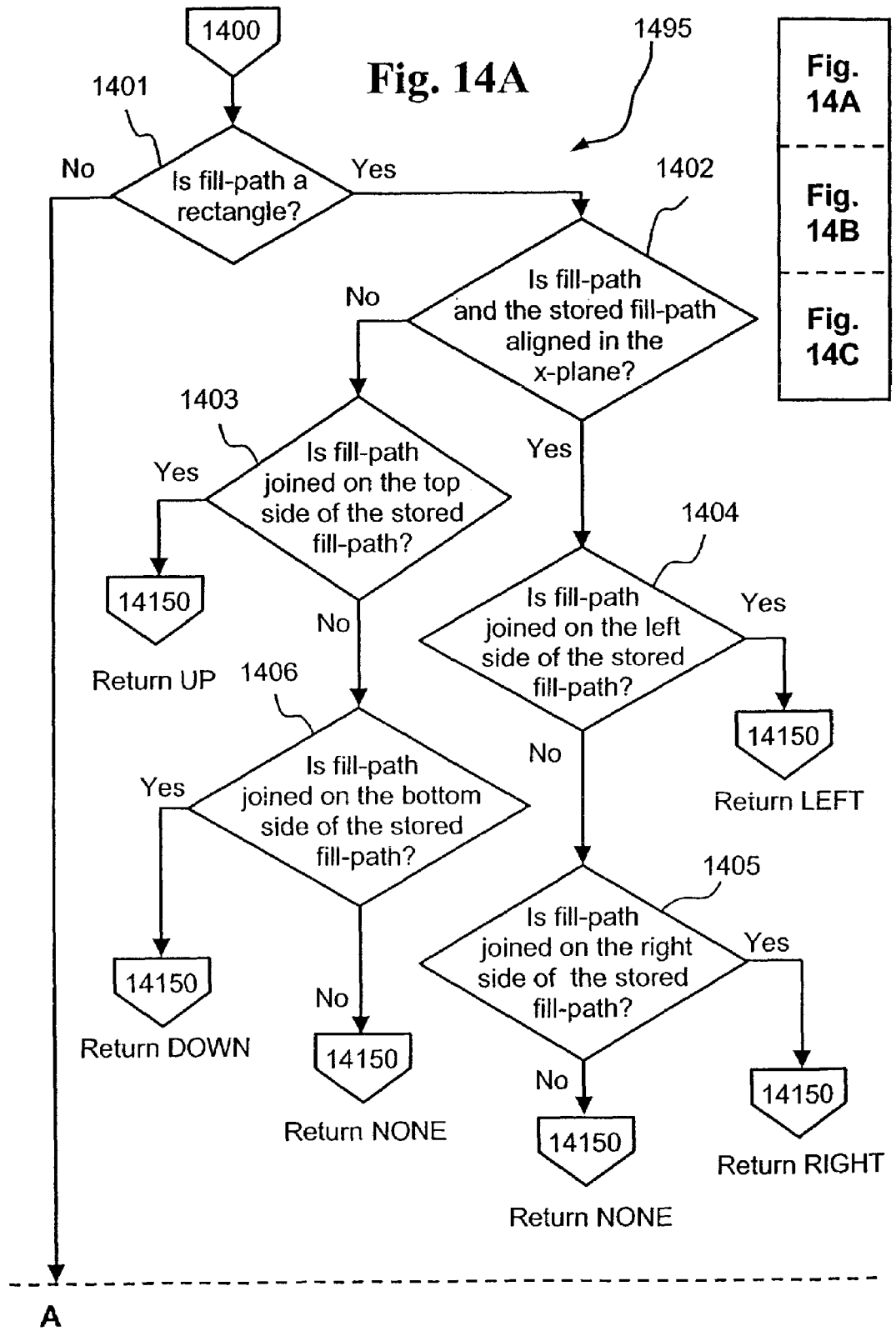

Turning now to FIGS. 14A to 14C, there is shown a flow chart of the get_alignment sub-process 1495 called by the add_rect 1105, check_fill 1205, and check_output_fill 1305 sub-processes of FIGS. 11, 12, and 13 respectively. This get_alignment sub-process 1495 is responsible for determining the direction of the gradient presently comprising the single fill-path in the currently stored gradient fill and the currently received fill-path. The get alignment sub-process 1495 commences at step 1400 when it is called either by step 1220 (FIG. 12) of the check_fill sub-process 1205, step 1120 (FIG. 11) of the add_rect sub-process 1105, or step 1340 (FIG. 13) of the check_output_fill sub-process 1305. These steps 1220, 1120, and 1340 passes during step 1400 to this get_alignment sub-process 1495 the currently received fill-path.

After completion of step 1400, the get_alignment sub-process 1495 proceeds to step 1401, where the get_alignment sub-process 1495 checks whether the currently received fill-path is rectangle. If the check 1401 reveals the currently received fill-path is a rectangle then the get_alignment sub-process 1495 proceeds to step 1402. The get_alignment sub-process 1495 in step 1402 checks whether the currently received fill-path and the single fill-path in the currently stored gradient fill are aligned in the x-plane. If the check 1402 reveals that they are aligned in the x-plane, the get_alignment sub-process 1495 proceeds to step 1404. On the other hand, if the check 1402 reveals that they are not aligned in the x-plane the get_alignment sub-process 1495 proceeds to step 1403.

The get_alignment sub-process 1495 in step 1403 checks whether the currently received fill-path is joined on the top side of the single fill-path in the currently stored gradient fill. If the check 1403 returns TRUE (yes), then the get_alignment sub-process 1495 terminates 14150 and returns the direction UP to its calling sub-process. On the other hand, if the check 1403 returns FALSE (no), then the get_alignment sub-process 1495 proceeds to step 1406.

The get_alignment sub-process 1495 in step 1406 checks whether the currently received fill-path is joined on the bottom side of the single fill-path in the currently stored gradient fill. If the check 1406 returns TRUE (yes), then the get alignment sub-process 1495 terminates 14150 and returns the direction DOWN to its calling sub-process. On the other hand, if the check 1406 returns FALSE (no), then the get_alignment sub-process 1495 terminates 14150 and returns the direction NONE to its calling sub-process. It will be apparent in the latter case the fill-paths are not joined indicating there is no blend.

The get_alignment sub-process 1495 in step 1404 checks whether the currently received fill-path is joined on the left side of the single fill-path in the currently stored gradient fill. If the check 1404 returns TRUE (yes), then the get_alignment sub-process 1495 terminates 14150 and returns the direction LEFT to its calling sub-process. On the other hand, if the check 1404 returns FALSE (no), then the get_alignment sub-process 1495 proceeds to step 1405.

The get_alignment sub-process 1495 in step 1405 checks whether the currently received fill-path is joined on the right side of the single fill-path in the currently stored gradient fill. If the check 1405 returns TRUE (yes), then the get_alignment sub-process 1495 terminates 14150 and returns the direction RIGHT to its calling sub-process. On the other hand, if the check 1405 returns FALSE (no), then the get_alignment sub-process 1495 terminates 14150 and returns the direction NONE to its calling sub-process. It will be apparent in the latter case the fill-paths are not joined indicating there is no blend.

On the other hand if the check 1401 reveals that the currently received fill-path is not a rectangle, then the get_alignment sub-process 1495 proceeds to step 1410. In step 1410, the currently received fill-path and the single fill-path in the currently stored gradient fill are checked to see if their point's 1.y align. If so, then the gradient fill will be a horizontal type fill (FIGS. 6A to 6D), and the get_alignment sub-process 1495 proceeds to step 1420. Otherwise, the gradient fill will be a vertical type fill (FIGS. 5A to 5D), and the get_alignment sub-process 1495 proceeds to step 1480.

The get_alignment sub-process 1495 at step 1420 checks the single fill-path in the currently stored gradient fill to see if its point 1.x is less than its point 4.x in the x-plane. If this is so, then the fill is either HDOWNRIGHT, HUPRIGHT, or NONE (FIG. 6A or FIG. 6B) and the get_alignment sub-process 1495 proceeds to step 1450. In step 1450, the get_alignment sub-process 1495 checks whether point 1 of the fill-path of the currently stored gradient fill is located near the top bound of the bounding rectangle. If this is so, then the fill is deemed to be an HDOWNRIGHT fill, see FIG. 6A and the get_alignment sub-process 1495 terminates 14150 and returns HDOWNRIGHT to its calling step. Otherwise the get_alignment sub-process 1495 proceeds to step 1460. The get_alignment sub-process 1495 then checks in step 1460 whether point 1 of the fill-path of the currently stored gradient fill is located near the bottom bound of the bounding rectangle. If this is so, the fill is deemed to be an HUPRIGHT fill (see FIG. 6B) and the get_alignment sub-process 1495 terminates 14150 and returns HUPRIGHT to its calling step. Otherwise the fill is deemed not to have a direction, ie. NONE and the get_alignment sub-process 1495 terminates and returns the value NONE to its calling step.

On the other hand, if the get_alignment sub-process 1495 at step 1420 determines that point 1.x of the single fill-path in the currently stored gradient fill is greater than or equal to its point 4.x in the x-plane, then the get alignment sub-process 1495 proceeds to step 1430. The get_alignment sub-process 1495 at step 1430 checks whether the point 1 of the single fill-path in the currently stored gradient fill is greater than its point 4 in the x-plane. If not then the fill is deemed to have no direction (viz NONE) and the get alignment sub-process 1495 terminates 14150 and returns the value NONE to its calling step. Otherwise the get_alignment sub-process 1495 proceeds to step 1440.

The get_alignment sub-process 1495 in step 1440, checks whether point 1.y of the single fill-path in the currently stored gradient fill is located near the top bound of the bounding rectangle in the y plane. If this is not so, then this fill is deemed to be an HUPLEFT (FIG. 6D) and the get_alignment sub-process 1495 terminates 14150 and returns the value HUPLEFT to its calling step. Otherwise, the get alignment sub-process 1495 proceeds to step 1470. The get_alignment sub-process 1495 in step 1470, checks whether point 1.y of the single fill-path in the currently stored gradient fill is located near the bottom bound of the bounding rectangle in the y plane. If this is so, then the fill is, deemed to be an HDOWNLEFT fill, (see FIG. 6C), and the get_alignment sub-process 1495 terminates 14150 and returns the value HDOWNLEFT to its calling step. Otherwise, the fill is deemed to have no direction (NONE) and the get_alignment sub-process 1495 terminates 14150 and returns the value NONE to its calling step.

The get_alignment sub-process 1495 in step 1480 checks to see if the currently received fill-path and the stored fill-path in the currently stored gradient fill have the same x value for point 1. If this is not true then the fill-paths are not aligned and don't form a gradient fill and the get_alignment sub-process 1495 terminates and returns the value NONE to its calling step. Otherwise, the get_alignment sub-process 1495 proceeds to step 1490.

The get_alignment sub-process 1495 in step 1490 tests whether point 1 of the stored fill-path in the currently stored gradient fill is less than point 4 of the same fill-path in the y-plane. If this is true then the fill is either a VDOWNLEFT or VDOWNRIGHT, (refer to FIGS. 5A and 5B) and the get_alignment sub-process 1495 proceeds to step 14120.

The get_alignment sub-process 1495 in step 14120 checks to see if point 1 of the stored fill-path in the currently stored gradient fill is located near to the right side of the bounding rectangle. If this is true then the fill is deemed to be VDOWNLEFT—see FIG. 5B and the get_alignment sub-process 1495 terminates 14150 and returns the value VDOWNLEFT to its calling step. Otherwise, the get_alignment sub-process 1495 proceeds to step 14130.

The get_alignment sub-process 1495 in step 14130 checks to see if point 1 of the stored fill-path in the currently stored gradient fill is located near the left side of the bounding box. If this is true then the fill is deemed to be VDOWNRIGHT—see FIG. 5A, and the get_alignment sub-process 1495 terminates 14150 and returns the value VDOWNRIGHT to its calling step. Otherwise, the fill-paths are deemed not to be aligned, and the get_alignment sub-process 1495 terminates 14150 and returns the value NONE to its calling step.

Otherwise if step 1490 returns false (No), then the get_alignment sub-process 1495 proceeds to step 14100 The get_alignment sub-process 1495 in step 14100 tests whether point 1 of the stored fill-path in the currently stored gradient fill is greater than point 4 (in the y-plane) of the same fill-path. If it is not the fill-paths are deemed not to be aligned and the get_alignment sub-process 1495 terminates 14150 and returns the value NONE to its calling step. Otherwise, the get_alignment sub-process 1495 proceeds to step 14110.

The get_alignment sub-process 1495 in step 14110, tests whether point 1 of the single fill-path stored in the currently stored gradient fill to see if it is located near to the right side of the bounding rectangle. If this is true the fill is deemed to be VUPLEFT—see FIG. 5C and the get_alignment sub-process 1495 terminates 14150 and returns the value VUPLEFT to its calling step. Otherwise, the get_alignment sub-process 1495 proceeds to step 14140.

The get_alignment sub-process 1495 in step 14140 tests whether the point 1 of fill-path in the currently stored gradient fill to see if it is located near the left side of the bounding box. If this is true, then the fill is deemed to be an VUPRIGHT, see FIG. 5D, and the get_alignment sub-process 1495 terminates 14150 and returns the value VUPRIGHT to its calling step. Otherwise the fill-paths are deemed not to be aligned, and the get_alignment sub-process 1495 terminates 14150 and returns the value NONE to its calling step.

As can been seen, at any stage the alignment or non-alignment has been determined then the alignment is simply returned to the calling sub-process.

3.5 flush_ramp Sub-Process

Figure 15:
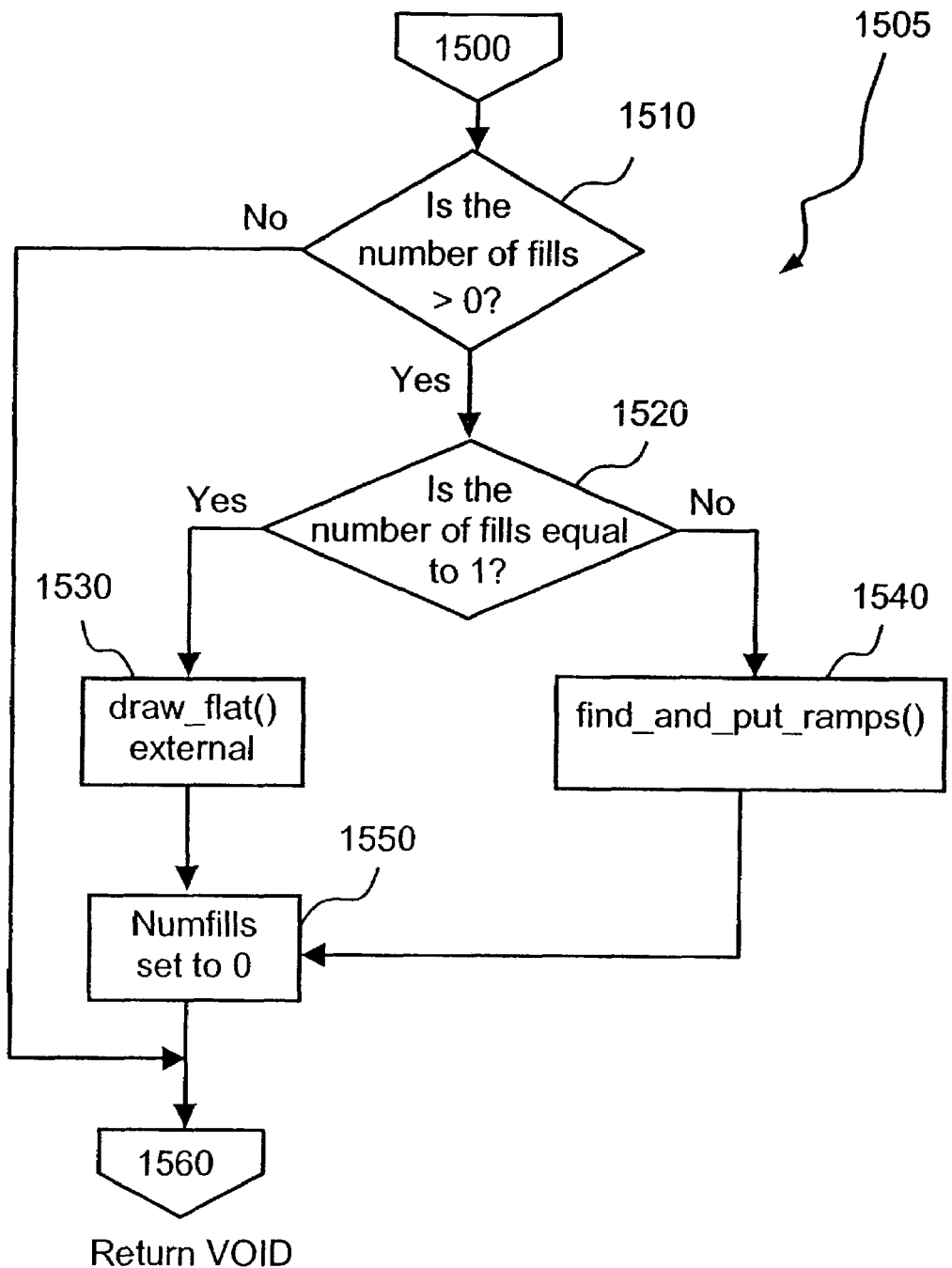
FIG. 15 shows a flow chart of the flush_ramp sub-process called by the method of FIG. 10.

Turning now to FIG. 15, there is shown a flow chart of the flush_ramp sub-process 1505 called by steps 1040 and 1070 of method 1005. This flush_ramp sub-process 1505 is primarily responsible for flushing the currently stored gradient fill. The flush_ramp sub-process 1505 commences at step 1500 when it is called by steps 1040 and 1070 (FIG. 10) of the method 1005. After commencement 1500, the flush_ramp sub-process 1505 proceeds to step 1510.

The flush_ramp sub-process 1505 at step 1510 checks the number of fill-paths in the currently stored gradient fill. If the check 1510 reveals that there is no fill-paths then the flush_ramp 1505 terminates 1560 and returns to the calling step 1040 or 1070 as any gradient fill has already been flushed. Otherwise, if the check 1510 reveals that there is 1 or more fill-paths in the currently stored gradient fill, the flush_ramp sub-process 1505 proceeds to step 1520.

The flush_ramp sub-process 1505 in step 1520 again checks the number of fills in the currently stored gradient fill. This time if the check 1520 reveals that the number of fills is one then the flush_ramp sub-process 1505 proceeds to step 1530. In step 1530, a call is made to an external function draw_flat in the first stage of the graphics rendering system for converting the single fill-path to an edge based format. After completion of step 1530, the flush_ramp sub-process 1505 proceeds to step 1550. On the other hand, if the check 1520 reveals that the number of fill-paths in the currently stored gradient fill is greater than one then the find_and_put_ramps function 1605 is called in step 1540. The find_and_put_ramps function 1605 is responsible for partitioning the currently stored gradient fill into a number of optimal linear blends and outputting these to the first stage of the graphics rendering system for conversion to an edge based format. The find_and_put_ramps function 1605 is described below in more detail with reference to FIG. 16. After completion of the find_and_put_ramps function 1605 in step 1540, the flush_ramp sub-process 1505 proceeds to step 1550.

The flush_ramp sub-process 1505 in step 1550 then flushes any fill-paths in the currently stored gradient fill and resets the variable numfills to zero. After completion of step 1550 the flush_ramp sub-process 1505 terminates and returns to the calling step 1040 or 1070 of the method 1005 (FIG. 10).

3.6 find_and_put_ramps Sub-Process

Figure 16:
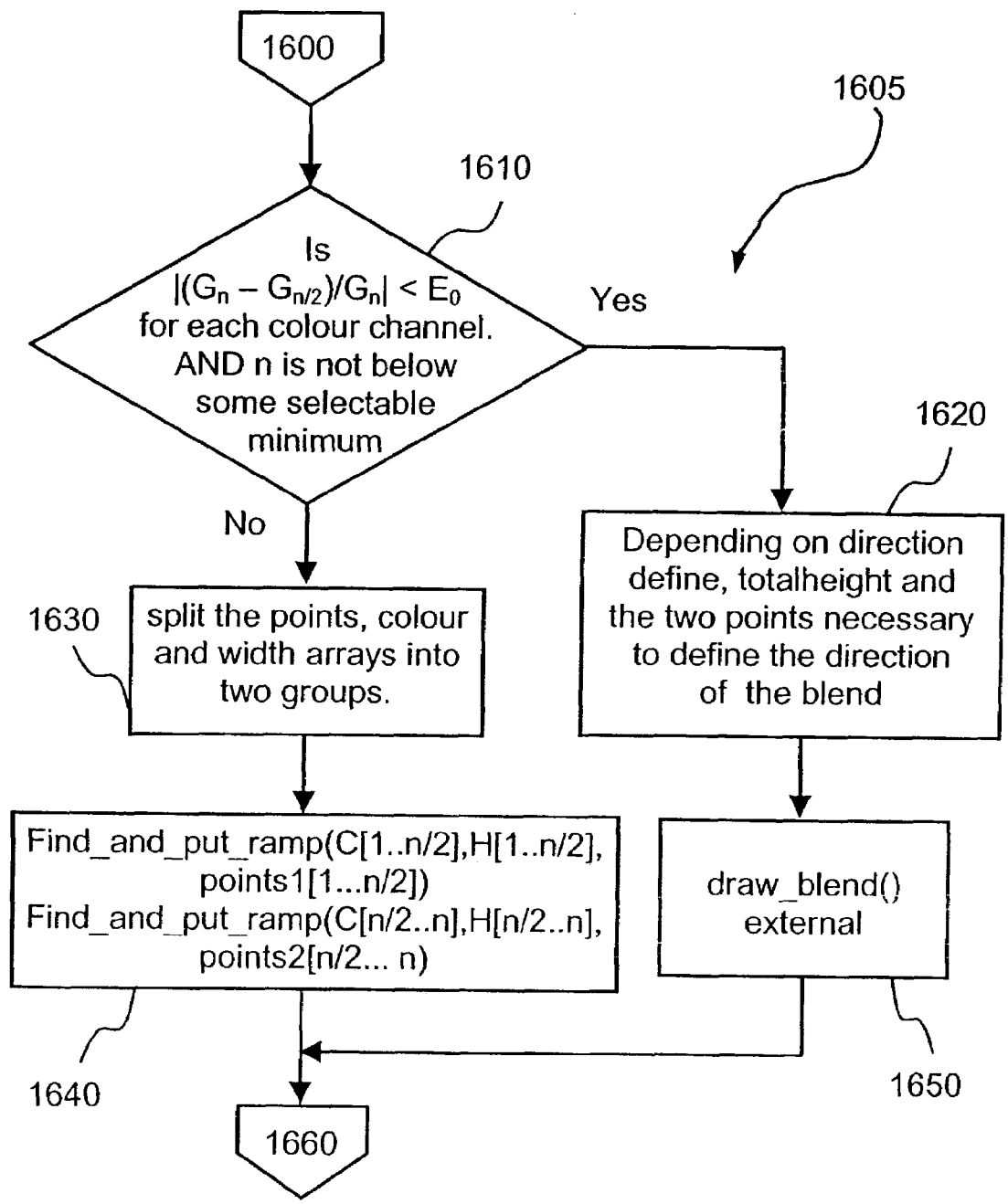
FIG. 16 shows a flow chart of the find_and_put_ramps sub-process initially called by the flush_ramp sub-process of FIG. 15.

Turning now to FIG. 16, there is shown a flow chart of the find_and_put_ramps sub-process 1605, which is initially called by step 1540 of the flush_ramp sub-process 1505 of FIG. 15. The find_and_put_ramps function 1605 is responsible for partitioning the currently stored gradient fill into a number of optimal linear blends and outputting these to the first stage of the graphics rendering system for conversion to an edge based format. The find_and_put_ramps sub-process 1605 is a recursive sub-process as will become apparent from the description below. The find_and_put_ramps sub-process 1605 commences at step 1600, where it takes as input the color, point and heights arrays of a set of fill-paths of the currently stored gradient fill-path. When the find_and_put_ramps sub-process 1605 is initially called by step 1540 of the flush_ramp process 1505 (FIG. 15), the color, point and heights arrays of the complete set of fill-paths in the currently stored gradient fill are passed to the find_and_put_ramps sub-process 1605. For sake of explanation, the complete set of fill-paths are denoted as fill-paths[1 . . . n], and their respective color, point and height arrays as C[1 . . . n], points[1 . . . n], and H[1 . . . n] respectively.

After commencement 1600, the find_and_put_ramps sub-process 1605 proceeds to step 1610. The find_and_put_ramps sub-process 1605 in step 1610 then checks whether the color gradient of the first half of the set of fill-paths

[1 . . . n] is not similar to the color gradient of the entire set of fill-paths [1 . . . n] (eg. red, green, blue and alpha channels for an RGBA flat color) in accordance with Equation (2) mentioned above. The step 1610 also checks whether n is not below a predefined minimum, which minimum is preferably set to 5 or a number of similar order of magnitude. If the check 1610 reveals the color gradients are not similar, that is fail to meet the requirements of Equation (2), and n is not below some predefined threshold, then the find_and_put_ramps sub-process proceeds 1605 to step 1630. Otherwise, the find_and_put_ramps sub-process 1605 proceeds to step 1620.

The find_and_put_ramps sub-process 1605 in step 1620 calculates the total-height depending on the direction of the fill, and calculates the two points necessary to define the points for which the gradient fill is to be applied. These two points need to be calculated such that the gradient fill can be applied in the correct direction, refer to FIGS. 8A and 8B. The first point is always defined as point one of the stored fill-path points. The second point, (Q, P), is found by using the total-height and the formula shown in FIGS. 14A to 14C, depending on whether the gradient fill is a horizontal or vertical type.

The find_and_put_ramps sub-process 1605 in step 1640 again calls in turn the find_and_put_ramps sub-process 1605 for each one of these new two sets of arrays (C[1 . . . n/2], H[1 . . . n/2], P[1 . . . n/2]) and (C[n/2 . . . n], H[n/2 . . . n], P[n/2 . . . n]). After completion of step 1640, the find_and_put_ramps sub-process 1605 terminates 1660 and the method 1005 returns to step of 1550 of the flush-ramp sub-process 1505 (FIG. 15).

The find_and_put_ramps sub-process 1605 in step 1620 calculates the total-height depending on the direction of the fill, and calculates the two points necessary to define the points for which the gradient fill is to be applied. These two points need to be calculated such that the gradient fill can be applied in the correct direction, refer to FIGS. 8A to 8C. The first point is always defined as point one of the stored fill-path points. The second point, (Q, P), is found by using the total-height and the formula shown in FIGS. 14A to 14C, depending on whether the gradient fill is a horizontal or vertical type.

After completion of step 1620, find_and_put_ramps sub-process 1605 proceeds to step 1650. During step 1650, a call is made to an external function draw_blend for generating and outputting to the graphics rendering system a linear blend using these two points determined in step 1620, the starting color, and color gradient per color channel per pixel. Any known function for generating a linear blend would be suitable. After completion of step 1650, the find_and_put_ramps sub-process 1605 terminates and returns to its calling step 1640 or 1540.

The aforementioned method 1005 and sub-processes comprise a particular control flow. There are other variants of the method 1005, which use different control flows without departing the spirit of the invention. Furthermore one or more of the steps of the method 1005 may be performed in parallel rather sequential.

4.0 Alternate Method

An alternate method of generating a linear blend may be performed by modifying the method 1005, described above, in the manner shown in FIG. 18. This alternate method derives primarily from substantial simplification of the get_alignment sub-process and consequential modifications to some of the other sub-processes. In the following description, those method steps and processes that are common with steps and processes previously described are indicated using the same reference numeral.

Figure 18:
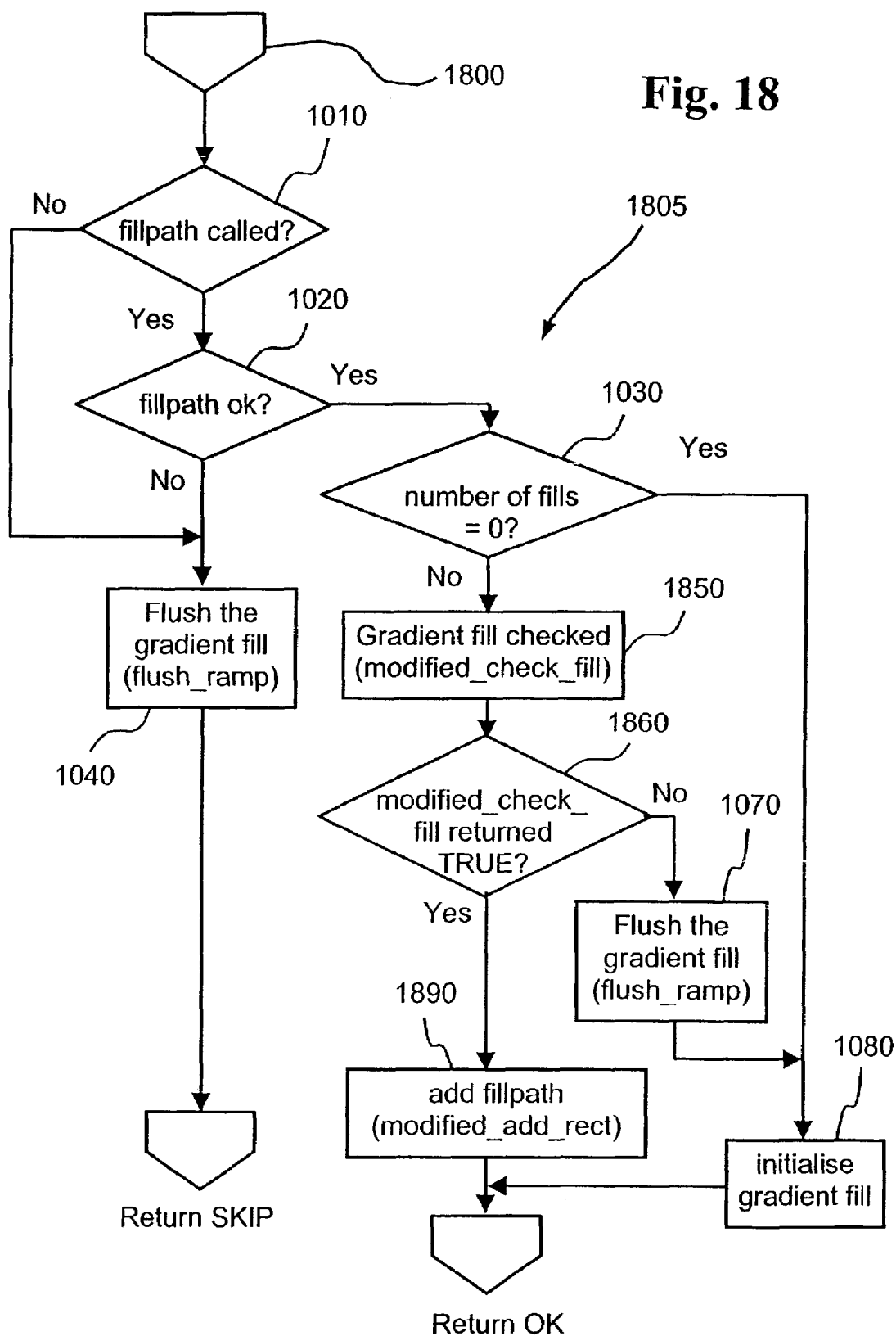
FIG. 18 is a flowchart showing an alternate method for generating one or more linear blends.

As seen in FIG. 18, the alternate method 1805 has an entry point 1800 which passes to steps 1010, 1020, 1030 and 1040 each of which operate in the manner previously described. A "No" result from step 1030 invokes a step 1850 to check the gradient fill. The step 1850 calls a modified_check_fill sub-process 2005 seen in FIG. 20. The sub-process 2005 has an entry point 2000 which passes to step 1210 which operates as before and passes to a decision step 2002.

Figure 20:
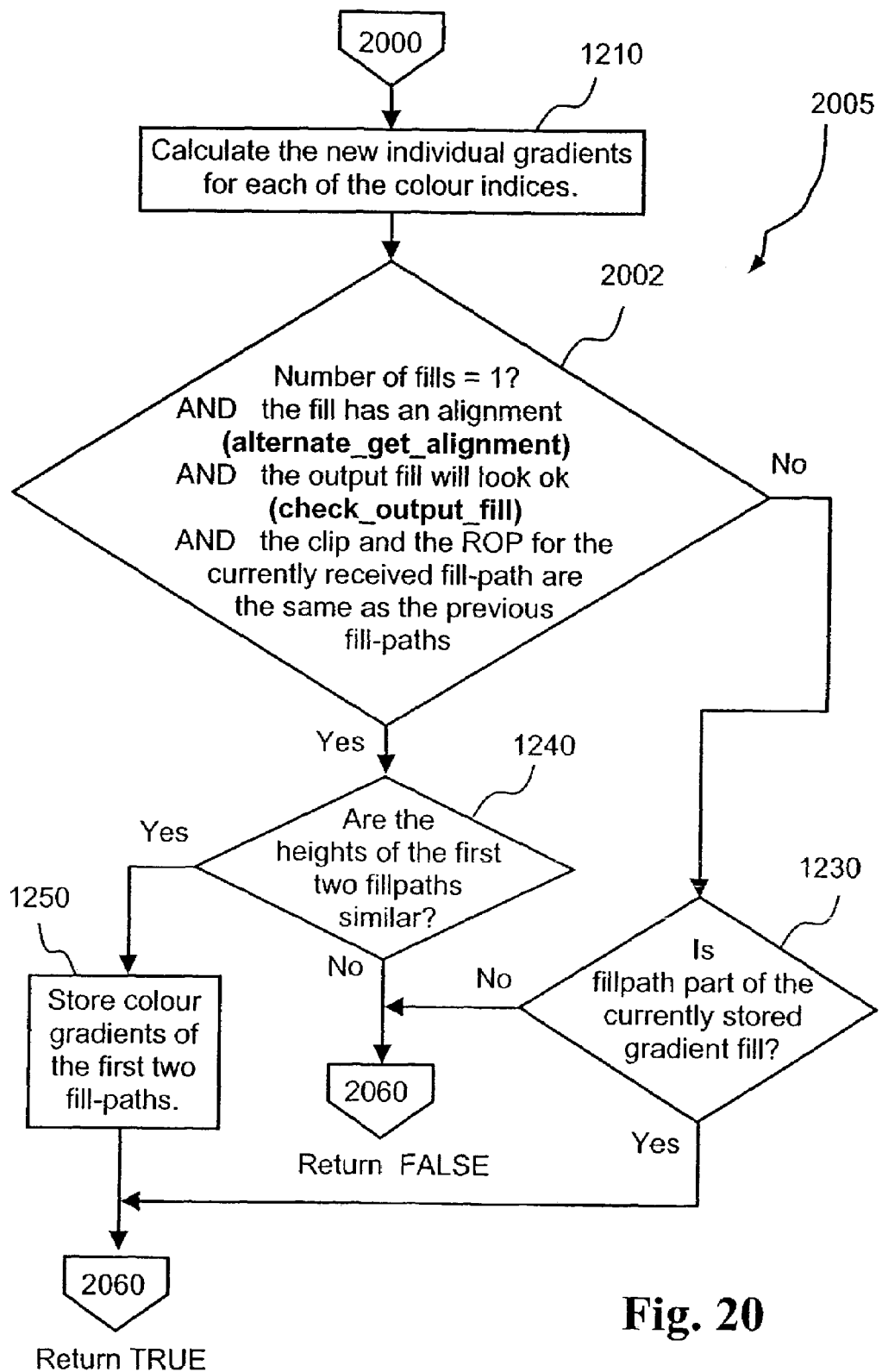
FIG. 20 is a flowchart of a modified_check_fill sub-process useful in the alternate method of FIG. 18.

The modified_check_fill sub-process 2005, during the decision step 2002 first tests to see if there is only one fill-path stored in the current gradient fill. Secondly, it tests that the currently received fill-path is aligned with the currently stored gradient fill by calling an alternate_get_alignment sub-process 2105 described below with reference to FIG. 21. Thirdly, it tests if the fill-path in the currently stored gradient fill together with the currently received fill-path will look correct by calling a modification to the check_output_fill flowchart of FIG. 13. Although the modification is not separately illustrated, such will be apparent from the following description and FIG. 13. In the modification, if the check 1330 of FIG. 13 reveals that the maximum color gradient is larger than or equal to predefined maximum (ie. No), the present modification of the check_output fill sub-process directly terminates at 13100 and returns a FALSE to step 2002 of the modified_check_fill sub-process 2005 (FIG. 20). In this modified implementation, steps 1340, 1350, 1360, 1380 and 1390 of FIG. 13 are completely omitted. This tells the modified_check_fill process 2005 (FIG. 20) that the gradient fill should not be created. The decision step 2002 finally checks if the clip and the raster operation (ROP) for the currently received fill-path are the same as the fill-paths stored in the currently stored gradient fill. Clip objects contain a unique identifier that can be used to check for a consistent clip. This unique identifier is set by the GDI layer. Clipping regions that use the same area as the fill-path themselves are treated as a NULL clip.

The remaining steps 1230, 1240 and 1250 of the modified_check_fill sub-process 2005 of FIG. 20 correspond to those described with respect to FIG. 12, which need not be repeated, and return via step 2060 to step 1860 of FIG. 18.

Figure 21:
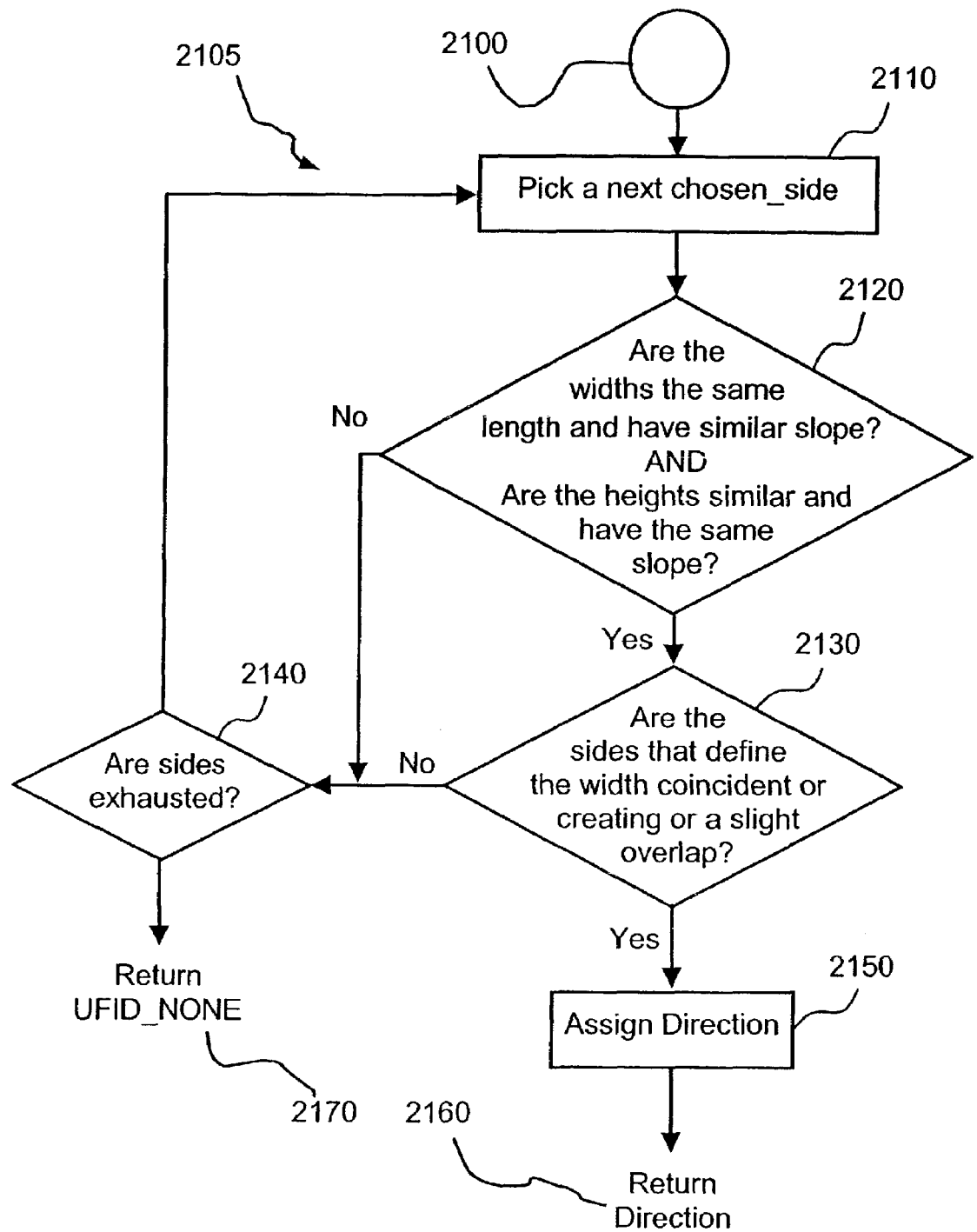
FIG. 21 is a flowchart of a alternate_get_alignment sub-process useful in the alternate method of FIG. 18.

When the alternate_get_alignment sub-process 2105 is called, process passes to an entry point 2100 seen in FIG. 21.

In step 2110 a side is picked to be the "chosen_side". The chosen side is based on the points that make up the fill-path. Both the new fill-path and stored fill-path have the same chosen side at any one time. In this regard, the chosen side may be defined as the side that lies between point 0 and point 1 of a fill-path. Since no direction has yet been determined, the width is assumed to be the length of the chosen side, and the height as the length of the sides adjacent to the chosen side. If, in step 2110, a chosen_side has already been assigned within this sub-process then a next side is assigned to be the chosen_side. No side is assigned to be the chosen_side more than once within any one call to the sub-process 2105.

Step 2120 then checks to see if the width of the newly received fill-path is the same as the width of the stored fill-path and that the slopes of these widths are similar. It is often found that two adjacent fill-paths are not exactly the same. There are definable tolerances within the algorithm to allow slight differences in the widths and lengths of a new fill-path compared to the first fill-path. The widths and heights of a particular fill-path are calculated using the individual x and y components of the points that make up a fill-path. The tolerance used in these calculations is preferably ±one pixel for the individual x and y components, but is easily changed depending on the requirements of the system. This tolerance is also used in testing the similarity of slopes. Step 2120 proceeds to check that the height of the new fill-path is equal or no more than two times the height of the first stored fill-path. If the heights are sufficiently similar, step 2120 then proceeds to step 2130, otherwise step 2140 proceeds.

Step 2130 then checks to see if the side opposite the chosen side of the newly received fill-path is coincident or overlaps the chosen side of the stored fill-path. To be a legitimate overlap, the full width of both the new fill-path and the stored fill-path must overlap. There is a configurable tolerance used in the determination of such an overlap, preferably in the order of ±one pixel in the x and or y direction. An overlap is also only valid if the overlap height is less than half the height of the last fill-path in the currently stored gradient fill. Separate fill-paths that do not touch each other are not considered coincident or overlapping even if they are within the aforementioned tolerance levels. If the sides are coincident or overlap then a direction can be defined and step 2150 proceeds. Otherwise if the sides do not coincide or overlap then a direction cannot be determined and step 2130 proceeds to step 2140.

In step 2150, a direction is assigned to the currently stored linear ramp. The direction is based on the current chosen side. If the chosen side is 01 then the direction is DIR_21, if the chosen side is 12 then the direction is DIR_01, if the chosen side is 23 then the direction is DIR_12 and of the chosen side is 30 then the direction is DIR_10. The sub-process then terminates 2160 and then returns the appropriate direction to the calling step 2002.

In step 2140, if all four sides have been picked as the chosen side, then all possible alignments have been exhausted and a direction cannot be assigned to the fill-paths, DIR_NONE is returned 2170 to the calling step 2002. If all four sides have not been exhausted then the algorithm proceeds to step 2110.

Figure 19:
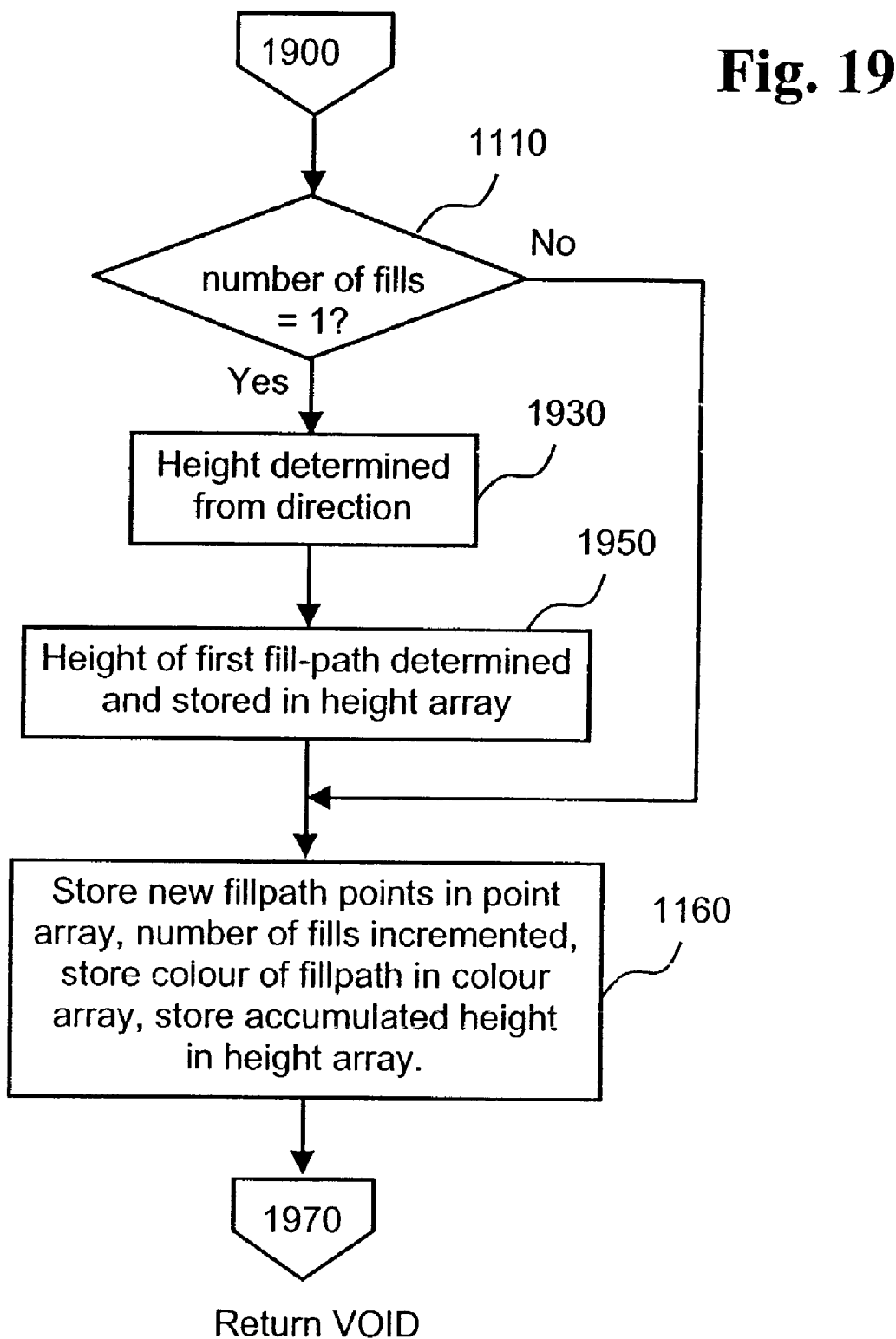
FIG. 19 is a flowchart of a modified_add_rect sub-process which can be applied to either one of the first method of FIG. 10 or the alternate method of FIG. 18.

After step 1850, the alternate method 1805 in step 1860 checks if the modified_check_fill sub-process 2005 has returned True. If not, steps 1070 and 1080 operate as previously described. If so, step 1890 follows and a fill-path is added using a modified_add_rect sub-process 1905 of FIG. 19. The sub-process 1905 may be used for either of the methods 1005 or 1805. The sub-process 1905 has an entry point 1900 which passes to step 1110 which operates as previously described. Where the number of fills is one (ie. Yes) step 1930 follows where the height of the fill is determined directly from the direction of the fill, as seen in FIGS. 23A-23D. This substantially simplifies the process previously performed in steps 1120, 1130, 1140 and 1150 (see FIG. 11).

After step 1930, step 1950 follows where the height of the first fill-path is determined and stored in the height array. If not, step 1160 follows, as it does after step 1950. The modified_add_rect sub-process 1905 then returns at step 1970 to the main method of FIG. 18, which then returns a parameter OK to the first stage of the graphics rendering system, telling that it does not need to convert and pass the fill-path on to the second stage of the graphics rendering system.

In operation of the alternate method 1805 of FIG. 18, as before, the steps 1040 and 1070 call the flush-ramp sub-process 1505 which, in turn, calls the find_and_put_ramps sub-process 1605. Step 1620 of the sub-process 1605 as previously mentioned operates to define the direction of blend using two points. In the alternate method 1805, those two points need to be calculated such that the gradient fill can be applied in the correct direction, as seen in FIG. 22. The first point chosen depends on the directions in which the gradient fill is travelling. If the fill has a direction of DIR_01 then the first point chosen is point 0 of the first fill-path in the stored gradient fill. If the fill has a direction of DIR_10 then the first point chosen is point 1 of the first fill-path in the stored gradient fill. If the fill has a direction of DIR_12 then the first point chosen is point 1 of the first fill-path in the stored gradient fill. If the fill has a direction of DIR_21 then the first point chosen is point 2 of the first fill-path in the stored gradient fill.

The second point chosen is determined by finding the intersection of Line B and Line C, this is shown as Point 2 (Q, P) in FIG. 8. Line B is the line perpendicular to Line A that passes through the first point of the gradient fill. Line A is the line that passes through the first point of the gradient fill and runs parallel to the width of the first fill-path in the stored gradient fill. Line C is the line runs parallel to the width of the stored fill-paths and passes through the second point that is described in the direction of the gradient fill (eg. for a DIR_01 gradient fill, Line C would pass through point 1 of the last fill-path). For gradient fills that travel horizontally or vertically, the second point of the gradient fill is simply the second point described in the direction of the fill of the last fill-path in the stored gradient fill. for example, for a direction of DIR_12, the second point of the gradient fill is point 2 of the last fill-path in the stored gradient fill.

5.0 Preferred Apparatus

The method of generating one or more linear blends is preferably practiced using a general-purpose computer system 1700, such as that shown in FIG. 10 or FIG. 18, wherein the process may be implemented as software, such as an application program executing within the computer system 1700. In particular, the steps of method of generating one or more linear blends are effected by instructions in the software that are carried out by the computer. The instructions may be formed as one or more code modules, each for performing one or more particular tasks. The software may also be divided into a number of separate parts, in which one part performs the method of generating one or more linear blends and another part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for generating one or more linear blends.

The computer system 1700 is formed by a computer module 1701, input devices such as a keyboard 1702 and mouse 1703, output devices including a printer 1715, a display device 1714 and loudspeakers 1717. A Modulator-Demodulator (Modem) transceiver device 1716 is used by the computer module 1701 for communicating to and from a communications network 1720, for example connectable via a telephone line 1721 or other functional medium. The modem 1716 can be used to obtain access to the Internet, and other network systems, such as a Local Area Network (LAN) or a Wide Area Network (WAN), and may be incorporated into the computer module 1701 in some implementations.

The computer module 1701 typically includes at least one processor unit 1705, and a memory unit 1706, for example formed from semiconductor random access memory (RAM) and read only memory (ROM). The module 1701 also includes an number of input/output (I/O) interfaces including an audio-video interface 1707 that couples to the video display 1714 and loudspeakers 1717, an I/O interface 1713 for the keyboard 1702 and mouse 1703 and optionally a joystick (not illustrated), and an interface 1708 for the modem 1716 and printer 1715. In some implementations, the modem 1716 may be, incorporated within the computer module 1701, for example within the interface 1708. A storage device 1709 is provided and typically includes a hard disk drive 1710 and a floppy disk drive 1711. A magnetic tape drive (not illustrated) may also be used. A CD-ROM drive 1712 is typically provided as a non-volatile source of data. The components 1705 to 1713 of the computer module 1701, typically communicate via an interconnected bus 1704 and in a manner which results in a conventional mode of operation of the computer system 1700 known to those in the relevant art. Examples of computers on which the described arrangements can be practiced include IBM-PC's and compatibles, Sun Sparcstations or alike computer systems evolved therefrom.

Typically, the application program is resident on the hard disk drive 1710 and read and controlled in its execution by the processor 1705. Intermediate storage of the program and any data fetched from the network 1720 may be accomplished using the semiconductor memory 1706, possibly in concert with the hard disk drive 1710. In some instances, the application program may be supplied to the user encoded on a CD-ROM or floppy disk and read via the corresponding drive 1712 or 1711, or alternatively may be read by the user from the network 1720 via the modem device 1716. Still further, the software can also be loaded into the computer system 1700 from other computer readable media. The term "computer readable medium" as used herein refers to any storage or transmission medium that participates in providing instructions and/or data to the computer system 1700 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1701. Examples of transmission media include radio or infra-red transmission channels as well as a network connection to another computer or networked device, and the Internet or Intranets including e-mail transmissions and information recorded on Websites and the like.

The method of generating one or linear blends may alternatively be implemented in dedicated hardware such as one or more integrated circuits performing the functions or sub functions of generating one or more linear blends. Such dedicated hardware may form part of graphics rendering system.

INDUSTRIAL APPLICABILITY

It is apparent from the above that the arrangements described are applicable to the computer graphics and printing industries.

The foregoing describes only some embodiments of the present invention, and modifications and/or changes can be made thereto without departing from the scope and spirit of the invention, the embodiments being illustrative and not restrictive.

We claim:

1. A method of generating one or more linear blends from a list of one or more fill-paths defining a current gradient fill portion, and at least one new fill-path, where the fill-paths each comprise a single colored parallelogram, the method comprising the steps of:
   (a) adding one said new fill-path to said list to become a most-recent fill-path in said list, if each condition of a set thereof is met, otherwise proceeding to step (c), said set comprising at least one condition, said one condition comprising a difference in color between the color of the new fill-path and the color of the most-recent fill-path in said list being no greater than an error factor, and said error factor is changed from at least one previously used error factor for said list of fill-paths due to dependence of the error factor on the difference in color between the most-recent and the second-most-recent fill-paths in said list;
   (b) repeating said step (a) for each remaining said new fill-path;
   (c) generating a plurality of linear blends from the first fill-path in said list to the most-recent fill-path in said list such that said gradient fill portion represented by said fill-paths is approximated with a least number of linear blends; and
   d) outputting the generated linear blends to an outer means being at least one of the storage device for storing the linear blends and a display device for displaying the linear blends.

2. A method according to claim 1, wherein said one condition considers the difference in color in each color channel.

3. A method according to claim 1, wherein said error factor is a multiple of the difference in color between the most-recent and the second-most-recent fill-paths in said list.

4. A method according to claim 1, wherein said set of conditions further comprises:
   a second condition that the new fill-path is physically contiguous or overlapping with the most-recent fill-path in the list.

5. A method according to claim 4 wherein a contiguity between said fill-paths is determined by at least comparing the alignment thereof.

6. A method according to claim 1, wherein a said set of conditions further comprises:
   a third condition that a height of said new fill-path is no greater than two times a height of the most recent fill-path in said list, said height being measured in a direction determined by physical positions of the fill-paths of said list.

7. A method according to claim 1, wherein said set of conditions further comprises:
   a fourth condition that the number of fill-paths in the current linear blend is greater than 1.

8. A method according to claim 1, wherein said set of conditions further comprises:
   a fifth condition that a sum of the accumulated height of the fill-paths in said linear blend and a rectangle-height of said new fill-path is less than a predefined maximum.

9. A method according to claim 8 wherein said predefined maximum is set such that the fill does not extend beyond a boundary of an output medium.

10. A method according to claim 1, wherein said set of conditions further comprises:

a sixth condition that a raster operation for the new fill-path does not use a destination, and is the same as a raster operation for the current linear blend.

11. A method according to claim 1, wherein said set of conditions further comprises:
a seventh condition that the new fill-path has the same clip as the current linear blend.

12. A method according to claim 1 wherein said list defining said current gradient fill portion relates to one or more already received fill-paths and said at least one new fill-path is newly received to thereby enable implementation of said method.

13. A computer readable medium encoded with a computer program element comprising computer program code means to make a computer execute a procedure to generate linear blends from a list of one or more fill-paths defining a current gradient fill portion, and at least one new fill-path, where the fill-paths each comprise a single colored parallelogram, the program code means comprising:
adding code means for adding one said new fill-path to said list to become a most recent fill-path in said list, if each condition of a set thereof is met, otherwise executing said generation code means, wherein said set comprises at least one condition, said one condition comprising a difference in color between the color of the new fill-path and the color of the most-recent fill-path in said list being no greater than an error factor, and said error factor is changed from at least one previously used error factor for said list of fill-paths due to a dependence of the error factor on the difference in color between the most-recent and the second-most-recent fill-paths in said list;
code means for calling said adding code means for each remaining said new fill-path;
generating code means for generating a plurality of linear blends from the first fill-path in said list to the most-recent fill-path in said list such that said gradient fill portion represented by said fill paths is approximated with a least number of linear blends; and
output means for outputting the generated linear blends to at least one of a storage device for storing the linear blends and a display device for display of the linear blends.

14. A computer readable medium encoded with a computer program element according to claim 13, wherein said one condition considers the difference in color in each color channel.

15. A computer readable medium encoded with a computer program element according to claim 13, wherein said error factor is two times the difference in color between the most-recent and second-last fill-paths in said list.

16. A computer readable medium encoded with a computer program element according to claim 13, wherein said set of conditions further comprises conditions selected from the group consisting of:
a second condition that the new fill-path is physically contiguous or overlapping with the most-recent fill-path in the list;
a third condition that a height of said new fill-path is no greater than two times a height of the most recent fill-path in said list, said height being measured in a direction determined by physical positions of the fill-paths of said list;
a fourth condition that the number of fill-paths in the current linear blend is greater than 1;
a fifth condition that a sum of the accumulated height of the fill-paths in said linear blend and a rectangle-height of said new fill-path is less than a predefined maximum;
a sixth condition that a raster operation for the new fill-path does not use a destination, and is the same as a raster operation for the current linear blend; and
a seventh condition that the new fill-path has the same clip as the current linear blend.

17. A computer readable medium encoded with a computer program element according to claim 16 wherein said predefined maximum of said fifth condition is set such that the fill does not extend beyond a boundary of an output medium.

18. A computer readable medium encoded with a computer program element according to claim 16 wherein a contiguity between said fill-paths is determined by at least comparing the alignment thereof.

19. A computer readable medium encoded with a computer program element according to claim 13 wherein said list defining said current gradient fill portion relates to one or more already received fill-paths and said at least one new fill-path is newly received to thereby enable execution of program element.

20. A computer readable medium encoded with a computer program element according to claim 13 wherein said element comprises part of a graphical device interface.

21. Apparatus for generating one or more linear blends from a list of one or more fill-paths defining a current gradient fill portion, and at least one new fill-path, where the fill-paths each comprise a single colored parallelogram, said apparatus comprising:
means for adding one said new fill-path to said list to become a most-recent fill-path in said list, if each condition of a set thereof is met, otherwise enabling a generating means, said set comprising at least one condition, said one condition comprising a difference in color between the color of the new fill-path and the color of the most-recent fill-path in said list being no greater than an error factor, and said error factor is changed from at least one previously used error factor for said list of fill-paths due to dependence of the error factor on the difference in color between the most-recent and the second-most-recent fill-paths in said list;
means for repeating operation of said adding means for each remaining said new fill-path;
said generating means being operable to generate a plurality of linear blends from the first fill-path in said list to the most-recent fill-path in said list such that said gradient fill portion represented by said fill paths is approximated with a least number of linear blends; and
outputting means being at least one of the storage device for storing the linear blends and a display device for displaying the linear blends.

22. A method of generating linear blends from a list of one or more fill-paths defining a current gradient fill portion, and at least one new fill-path, where the fill-paths each comprise a single colored parallelogram, the method comprising the steps of:
(a) adding one said new fill-path to said list to become a most-recent fill-path in said list, if each condition of a set thereof is met, otherwise proceeding to step (c), said set comprising at least one condition, said one condition being based on the color of the new fill-path and the color of the most-recent fill-path and an error factor, and said error factor is preset to such a value so that the new fill-path will not be added to the list if the new fill-path does not visually form part of the current linear blend;

(b) repeating said step (a) for each remaining said new fill-path;

(c) generating a plurality of linear blends from the first fill-path in said list to the most-recent fill-path in said list by recursively partitioning the list according to exceeding a predetermined error tolerance of the color gradient between certain ones of the fill-paths such that said gradient fill portion represented by said fill paths is approximated with a least number of linear blends; and (d) providing the generated linear blends for at least one of storage in a storage device or display upon a display device.

23. The method according to claim 22, wherein said list comprises an original list of said fill-paths, fill-paths[1] ... [n], and said generating step (c) comprises the sub-steps of:

(ca) determining if the color gradient between fill-path[1] and fill-path[n] of the list is equal within a predetermined error tolerance of the color gradient between fill-path[1] and fill-path[n/2] of the list; and (caa) if so, outputting a linear blend for the list of fill-paths [1] ... [n], from the color and position of the first fill-path in said list to the color and position of the most recent fill-path in said list; otherwise (cab) partitioning the list of fill-paths [1] ... [n] into two lists of at least substantially equal number of fill-paths; and (cb) repeating step (ca) for each partitioned list, until all fill-paths in the original list of fill-paths [1] ... [n] have been processed.

24. A method according to claim 23 wherein step (cab) comprises partitioning said list into two lists, one for a first half of the list (fill-path[1] ... fill-path[n/2]) and one for a second half of the list (fill-path[n/2] ... fill-path[n]).

25. A method according to claim 23 wherein step (cab) comprises partitioning said list into two lists, one for a first half of the list (fill-path[1] ... fill-path[n/2]) and one for a second half of the list (fill-path[(n/2)+1] ... fill-path[n]).

26. A method according to claim 23, wherein a second linear blend corresponding to a second partitioned list of fill-paths is output adjacent a first linear blend corresponding to a first partitioned list of fill-paths, wherein an initial color of the second linear blend is set to a final color of the first linear blend.

27. A computer readable medium encoded with a computer program, the computer program comprising computer program code means to make a computer execute a procedure to generate linear blends from a list of one or mom fill-paths defining a current gradient fill portion, and at least one new fill-path, where the fill-paths each comprise a single colored parallelogram, the program code means comprising:

adding code means for adding one said new fill-path to said list to become a most-recent fill-path in said list, if each condition of a set thereof is met, otherwise executing generating code means, said set comprising at least one condition, said one condition being based on the color of the new fill-path and the color of the most-recent fill-path and an error factor, and said error factor is preset to such a value so that the new fill-path will not be added to the list if the new fill-path does not visually form part of the current linear blend;

code means for calling said code adding means for each remaining said new fill-path;

said generating code means being for generating a plurality of linear blends from, the first fill-path in said list to the most-recent fill-path in said list by recursively partitioning the list according to exceeding a predetermined error tolerance of the color gradient between certain ones of the fill-paths such that said gradient fill portion represented by said fill paths is approximated with a least number of linear blends; and output means for outputting the generated linear blends to at least one of a storage device for storing the linear blends and a display device for displaying the linear blends.

28. A computer readable medium encoded with a computer program according to claim 27, wherein said list comprises an original list of a plurality of said fill-paths, fill-paths [1] ... [n], and said generating code means comprises:

code means for determining if the color gradient between fill-path[1] and fill-path[n] of the list is within the predetermined error tolerance of the color gradient between fill-path[1] and fill-path[n/2] of the list; and if so, code means for outputting a linear blend for the list of fill-paths [1] ... [n], from the color and position of the first fill-path in said list to the color and position of the most-recent fill-path in said list; otherwise code means for partitioning the list of fill-paths [1] ... [n] into two lists of at least substantially equal number of fill-paths; and code means for calling said code means for determining for each partitioned list, until all fill-paths in the original list of fill-paths [1] ... [n] have been processed.

29. A computer readable medium encoded with a computer program according to claim 28 wherein said code means for partitioning partitions said list into two lists, one for a first half of the list (fill-path[1]... fill-path[n/2]) and one for a second half of the list (fill-path[n/2] ... fill-path [n]).

30. A computer readable medium encoded with a computer program element according to claim 28 wherein said code means for partitioning partitions said list into two lists, one for a first half of the list (fill-path[1] ... fill-path[n/2]) and one for a second half of the list (fill-path[(n/2)+1] ... fill-path[n]).

31. A computer readable medium encoded with a computer program according to claim 28, wherein a second linear blend corresponding to a second partitioned list of fill-paths is output adjacent a first linear blend corresponding to a first partitioned list of fill-paths, wherein an initial color of the second linear blend is set to a final color of the first linear blend.

32. Apparatus for generating linear blends from a list of one or more fill-paths defining a current gradient fill portion, and at least one new fill-path, where the fill-paths each comprise a single colored parallelogram, the apparatus comprising:

means for adding one said new fill-path to said list to become a most-recent fill-path in said list, if each condition of a set thereof is met, otherwise enabling generating means, said set comprising at least one condition, said one condition being based on the color of the new fill-path and the color of the most-recent fill-path and an error factor, and said error factor is preset to such a value so that the new fill-path will not be added to the list if the new fill-path does not visually form part of the current linear blend;

means for repeating operation of said adding means for each remaining said new fill-path;

said generating means being operable to generate a plurality of linear blends from the first fill-path in said list to the most-recent fill-path in said list by recursively partitioning the list according to exceeding a predetermined error tolerance of the color gradient between certain ones of the fill-paths such that said gradient fill portion represented by said fill paths is approximated with a least number of linear blends; and output means to which the generated linear blends are output, the output means being at least one of a storage device for storing the linear blends and a display device for displaying the linear blends.

* * * * *

UNITED STATES PATENT AND TRADEMARK OFFICE
CERTIFICATE OF CORRECTION

| | |
|---|---|
| PATENT NO. | : 7,304,648 B2 |
| APPLICATION NO. | : 10/458329 |
| DATED | : December 4, 2007 |
| INVENTOR(S) | : Ian Richard Beaumont et al. |

It is certified that error appears in the above-identified patent and that said Letters Patent is hereby corrected as shown below:

COLUMN 15:

Line 15, "11 05" should read --1105--.

COLUMN 17:

Line 45, "check_output$_{13}$ fill" should read --check_output_fill--.

COLUMN 21:

Line 33, "step 14100" should read --step 14100.--.

COLUMN 23:

Line 12, "1620." should read --1640. ¶ The find_and_put_ramps sub-process 1605 in step 1630 divides the points, color and heights arrays of the fill-paths [1...n] into two sets of points, color and heights arrays (C[1..n/2], H[1..n/2], P[1..n/2], and C[n/2..n], H[n/2..n], P[n/2..n]), where n is the size of the array, and if n is odd, n/2 is increased to the next highest integer. After completion of step 1630 the find_and_put_ramps sub-process 16 proceeds to step 1640.--.
    Lines 13-23 should be deleted.
    Line 37, "to 8C." should read --and 8B--.
    Line 57, "departing" should read --departing from--.

COLUMN 27:

Line 11, "be;" should read --be--.

COLUMN 28:

Line 26, "outer" should read --outside--.

COLUMN 30:

Line 28, "one or more" should be deleted.
    Line 52, "outputting" should read --output--; and "the" should read --a--.
    Line 54, "linear" should read --generated linear--.

UNITED STATES PATENT AND TRADEMARK OFFICE
CERTIFICATE OF CORRECTION

PATENT NO. : 7,304,648 B2
APPLICATION NO. : 10/458329
DATED : December 4, 2007
INVENTOR(S) : Ian Richard Beaumont et al.

It is certified that error appears in the above-identified patent and that said Letters Patent is hereby corrected as shown below:

COLUMN 31:

Line 50, "mom" should read --more--.

Signed and Sealed this

Tenth Day of February, 2009

JOHN DOLL
*Acting Director of the United States Patent and Trademark Office*